United States Patent
Miyoshi et al.

(10) Patent No.: US 7,612,305 B2
(45) Date of Patent: Nov. 3, 2009

(54) ROTATING-PRESSING OPERATION TYPE ELECTRONIC PART AND ELECTRONIC DEVICE USING THIS ROTATING-PRESSING OPERATION TYPE ELECTRONIC PART

(75) Inventors: Kazuaki Miyoshi, Ritto (JP); Satoshi Takamori, Otsu (JP)

(73) Assignee: OMRON Corporation, Kyoto (JP)

( * ) Notice: Subject to any disclaimer, the term of this patent is extended or adjusted under 35 U.S.C. 154(b) by 596 days.

(21) Appl. No.: 10/576,535

(22) PCT Filed: Oct. 14, 2004

(86) PCT No.: PCT/JP2004/015148

§ 371 (c)(1),
(2), (4) Date: Apr. 19, 2006

(87) PCT Pub. No.: WO2005/038844

PCT Pub. Date: Apr. 28, 2005

(65) Prior Publication Data

US 2007/0272530 A1 Nov. 29, 2007

(30) Foreign Application Priority Data

Oct. 20, 2003 (JP) .............................. 2003-359397

(51) Int. Cl.
*H01H 9/00* (2006.01)
(52) U.S. Cl. ........................................ 200/14; 345/184
(58) Field of Classification Search ...................... 200/4, 200/5 R, 14, 17 R, 18, 6 A, 336; 335/205–207; 341/20, 35; 345/156, 157, 160, 161, 184; 455/90.3, 550.1

See application file for complete search history.

(56) References Cited

U.S. PATENT DOCUMENTS

| 6,967,293 | B1 * | 11/2005 | Chen et al. ..................... 200/14 |
| 7,012,201 | B2 * | 3/2006 | Kodani et al. .................. 200/14 |
| 7,082,323 | B2 * | 7/2006 | Yang ........................ 455/575.1 |
| 7,088,348 | B2 * | 8/2006 | Siddiqui ..................... 345/184 |
| 7,145,557 | B2 * | 12/2006 | Yang .......................... 345/184 |
| 7,164,891 | B2 * | 1/2007 | Yang ........................ 455/90.3 |

(Continued)

FOREIGN PATENT DOCUMENTS

EP 1 085 546 A 3/2001

(Continued)

OTHER PUBLICATIONS

International Search Report for PCT/JP2004/015148 dated Nov. 22, 2004 (3 pages).

(Continued)

*Primary Examiner*—Michael A Friedhofer
(74) *Attorney, Agent, or Firm*—Osha • Liang LLP

(57) ABSTRACT

A rotating and pressing operation type electronic component that is reduced in the number of parts and man-hour for assembly and reduced in height dimension and floor surface area, comprising a frame formed of first and second bases, a tubular rotatingly operating body rotatably supported on the inside of the frame, first and second contact pieces as elastically deformable conductive leg parts fitted to the frame, and a common contact piece. The terminal parts of the contact pieces and the terminal parts of the common contact piece are directly positioned on a printed circuit board and electrically connected.

20 Claims, 28 Drawing Sheets

U.S. PATENT DOCUMENTS

| | | | |
|---|---|---|---|
| 7,212,834 B2 * | 5/2007 | Hsu et al. | 455/550.1 |
| 7,333,088 B2 * | 2/2008 | Boon et al. | 345/156 |

FOREIGN PATENT DOCUMENTS

| | | |
|---|---|---|
| EP | 1 094 483 A | 4/2001 |
| EP | 1 111 636 A | 6/2001 |
| JP | 50-35330 | 10/1975 |
| JP | 2001-135197 | 5/2001 |
| JP | 2001-148219 | 5/2001 |
| JP | 2001-256866 | 9/2001 |
| JP | 2003-109467 | 4/2003 |

OTHER PUBLICATIONS

JPO/NCIPI translation of JP-2003-92047 published Mar. 28, 2003, cited in specification (12 pages).

JPO/NCIPI translation of JP-2000-195388 published Jul. 14, 2000, cited in specificaton (21 pages).

Communication pursuant to Article 94(3) EPC issued in European Application No. 04 792 380.0-1231 dated Jun. 26, 2009, 5 pages.

* cited by examiner

ROTATING-PRESSING OPERATION TYPE ELECTRONIC PART AND ELECTRONIC DEVICE USING THIS ROTATING-PRESSING OPERATION TYPE ELECTRONIC PART

TECHNICAL FIELD

The present invention relates to a rotating-pressing operation type electronic part usable in a portable telephone, a personal computer, etc., and an electronic device using this rotating-pressing operation type electronic part.

BACKGROUND ART

As the rotating-pressing operation type electronic part used in the portable telephone, for example, there is conventionally a structure in which a U-shaped body 37 for rotatably supporting a columnar shape operating knob 25 and a plate-shaped body 26 are mounted to a base portion 23 mounting simplex push-on switches 22A, 22B to its surface (see FIGS. 1 and 3 of patent literature 1). Further, as another rotating-pressing operation type electronic part, there is a structure in which a flexible substrate 7 mounting a push button switch 8 is nipped and supported by an attaching plate 1 and a frame body 2 for rotatably supporting an operating knob 5 (see FIGS. 1 and 2 of patent literature 2).

Patent literature 1: JP-A-2000-195388
Patent literature 2: JP-A-2003-92047

DISCLOSURE OF THE INVENTION

Problems that the Invention is to Solve

However, each of the above rotating-pressing operation type electronic parts is attached to a substrate, etc. through the base portion 23 or the attaching plate 1. Accordingly, the number of parts and the number of assembly works are large, and the height size of the rotating-pressing operation type electronic part is large. There is particularly a limit in compactness of the base portion 23, etc. Therefore, a problem exists in that no rotating-pressing operation type electronic part having a small floor area can be obtained.

In consideration of the above problems, an object of the present invention is to provide a rotating-pressing operation type electronic part having a small number of parts and a small number of assembly works and having a small height size and a small floor area.

Means for Solving the Problem

To achieve the above object, a rotating-pressing operation type electronic part in the present invention comprises: a frame body; a rotating operation body of a sleeve shape rotatably supported within the frame body; and at least three electrically conductive leg portions attached to the frame body and able to be elastically deformed, wherein tip portions of the electrically conductive leg portions are directly positioned in a print substrate and are electrically connected to the print substrate.

EFFECT OF THE INVENTION

In accordance with the present invention, the base portion and the attaching plate as in the conventional example are not required. Accordingly, a rotating-pressing operation type electronic part reduced in the number of parts and the number of assembly works and having a small height size and a small floor area is obtained.

As an embodiment mode, the electrically conductive leg portion may also have a connecting portion approximately curved in a U-shape.

In accordance with this embodiment mode, since an elastic deforming area is lengthened, reaction force at a pressing operation time can be reduced without setting the rotating-pressing operation type electronic part to be large-sized. Further, since play is generated in the elastic deforming area, no high part size accuracy is required and fatigue breakdown due to a repeating operation can be prevented.

In accordance with another embodiment mode, a free end portion of the electrically conductive leg portion may be also divided into two portions, and may be also approximately bent in a V-shape.

In accordance with this embodiment mode, a rotating-pressing operation type electronic part easily elastically deformed is obtained while contact reliability is secured.

In accordance with another embodiment mode, at least one magnetic detecting means able to magnetically detect the rotation of the rotating operation body may be also arranged in the frame body.

In accordance with this embodiment mode, the rotation of the rotating operation body can be detected in non-contact by the magnetic detecting means, and a selecting range of a detecting method is widened. Further, since the magnetic detecting means is arranged in the frame body in advance, wiring of the print substrate is easily designed.

As a new embodiment mode, a push button switch may be also arranged on a lower face of the frame body. In accordance with this embodiment mode, since the push button switch is arranged in the frame body in advance, it is not necessary to arrange the push button switch in the print substrate and the wiring of the print substrate is easily designed.

An electronic device in the present invention is constructed by the rotating-pressing operation type electronic part according to any one of claims 1 to 4; and the print substrate for directly electrically connecting a tip portion of the electrically conductive leg portion of this rotating-pressing operation type electronic part, and mounting a push button switch so as to be located just below the frame body of the rotating-pressing operation type electronic part, wherein detecting data of a rotating direction and a rotating amount of the rotating operation body are outputted through the electrically conductive leg portion by rotating the rotating operation body of the rotating-pressing operation type electronic part, and the push button switch is operated by pushing down the frame body.

In accordance with the present invention, since the electrically conductive leg portion of the rotating-pressing operation type electronic part is directly electrically connected to the print substrate, the base portion and the attaching plate as in the conventional example are not required. Therefore, an electronic device having a small number of parts, a small number of assembly works and a small height size is obtained. Since the base portion, etc. as in the conventional example are not particularly required, the rotating-pressing operation type electronic part having a small floor area is obtained and integration density of the print wiring can be raised.

An electronic device in another invention is constructed by the rotating-pressing operation type electronic part according to any one of claims 1 to 4; and the print substrate for soldering and directly electrically connecting a tip portion of the electrically conductive leg portion of this rotating-pressing operation type electronic part, and mounting a push button switch so as to be located just below the frame body of the rotating-pressing operation type electronic part, wherein detecting data of a rotating direction and a rotating amount of the rotating operation body are outputted through the electrically conductive leg portion by rotating the rotating operation body of the rotating-pressing operation type electronic part, and the push button switch is operated by pushing down the frame body.

In accordance with the present invention, connecting reliability is improved since soldering is performed in addition to the effects of the above-mentioned inventions.

An electronic device in another invention is constructed by the rotating-pressing operation type electronic part according to claim 5; and the print substrate for directly electrically connecting a tip portion of the electrically conductive leg portion of this rotating-pressing operation type electronic part, and able to directly electrically connect a lead terminal of the push button switch of the rotating-pressing operation type electronic part, wherein detecting data of a rotating direction and a rotating amount of the rotating operation body are outputted through the electrically conductive leg portion by rotating the rotating operation body of the rotating-pressing operation type electronic part, and the push button switch is operated by pushing down the frame body.

In accordance with the present invention, it is not necessary to mount the push button switch to the print substrate in addition to the effects of the above-mentioned inventions. Accordingly, the wiring of the print substrate is easily designed, and the integration density of other electronic parts can be raised.

A rotating-pressing operation type electronic part of a new invention comprises: a frame body; a rotating operation body of a sleeve shape rotatably supported within the frame body; an annular magnet having N-poles and S-poles alternately arranged at a predetermined angle pitch and assembled into the rotating operation body on the same axis; and plural leg portions attached to the frame body and able to be elastically deformed, wherein the leg portions are directly positioned in a print substrate.

In accordance with the present invention, since the base portion and the attaching plate as in the conventional example are not required, the rotating-pressing operation type electronic part reduced in the number of parts and the number of assembly works and having a small height size and a small floor area is obtained. Further, since the rotation of the rotating operation body can be detected in non-contact, high detecting accuracy can be maintained for a long period.

An electronic device of a new invention is constructed by the rotating-pressing operation type electronic part according to claim 9; and the print substrate for mounting at least one magnetic detecting means in a position able to detect a magnetic flux of an annular magnet of this rotating-pressing operation type electronic part, and mounting a push button switch so as to be located just below the frame body of the rotating-pressing operation type electronic part, wherein a rotating direction and a rotating amount of the rotating operation body are detected by the magnetic detecting means by rotating the rotating operation body of the rotating-pressing operation type electronic part, and the push button switch is operated by pushing down the frame body.

In accordance with the present invention, since the electrically conductive leg portion of the rotating-pressing operation type electronic part is directly electrically connected to the print substrate, the base portion and the attaching plate as in the conventional example are not required. Therefore, an electronic device having a small number of parts, a small number of assembly works and a small height size is obtained. Since the base portion, etc. as in the conventional example are not particularly required, there are effects in that the rotating-pressing operation type electronic part having a small floor area is obtained and integration density of the print wiring can be raised.

DESCRIPTION OF THE REFERENCE NUMERALS AND SIGNS

Figure 1:
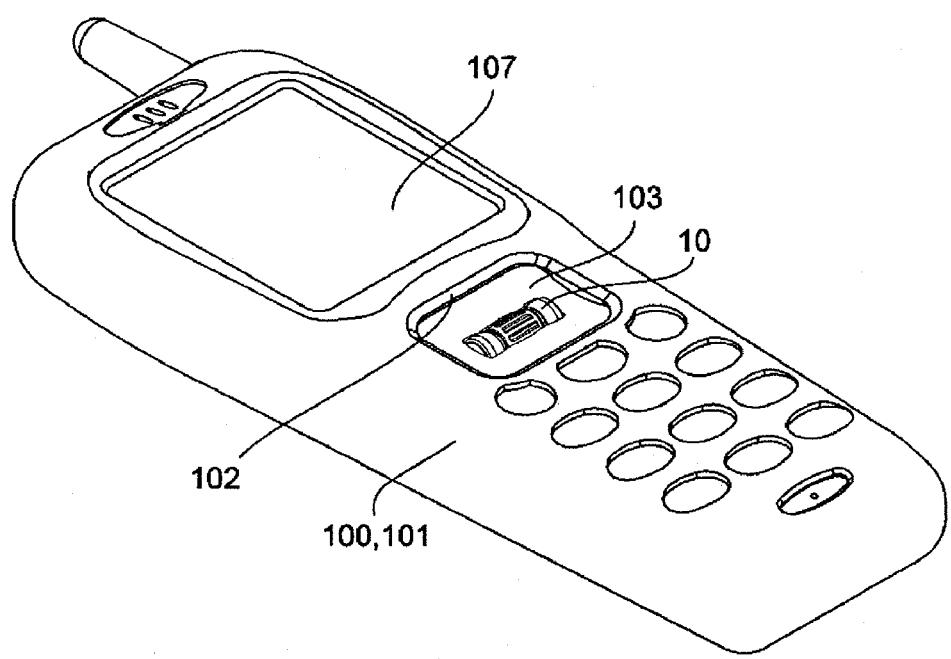
FIG. 1 is a perspective view of a first embodiment mode in accordance with the present invention when this first embodiment mode is applied to a portable telephone.

10: rotating-pressing operation type electronic part
20: first base
21: push-down pin
22: shaft portion
30, 35: first and second contact pieces
31, 36: elastic contact portion
32, 37: connecting portion
33, 38: terminal portion
40: cover for escape prevention
45: spring for an operating feel
50: common contact piece
51, 52: elastic contact portion
53: tongue piece
54: common terminal
55: tongue piece
56, 58: connecting portion
57, 59: terminal portion
60: rotating operation body
61: rotating operation portion
62, 63: pressing operation portion
64: projecting stripe
65: step portion
70: inner contact
71: extending portion
72: contact portion
80: second base
81: push-down pin
82: bearing portion
83, 84: arm portion
85, 86: guide pin
100: portable telephone
107: monitor
110: print substrate
111*a*, 111*b*: push button switch
112*a*, 112*b*, 112*c*: connecting pad
113*a*, 113*b*, 113*c*: connecting pad
114*a*, 114*b*: positioning hole
115*a*, 115*b*: Hall IC

BEST MODE FOR CARRYING OUT THE INVENTION

Embodiment modes in accordance with the present invention will be explained in accordance with the accompanying drawings of FIGS. 1 to 28.

As shown in FIGS. 1 to 10, a first embodiment mode shows a case applied to a rotating-pressing operation type electronic part 10 of a portable telephone 100.

In the above portable telephone 100, the above rotating-pressing operation type electronic part 10 is pressed against the surface of a print substrate 110 stored into a housing 101 of the portable telephone 100 and is prevented in escape by fitting a cover 103 to an opening portion 102 of this housing 101. The above cover 103 has a rectangular opening portion 104 into which a rotating operation body 60 of the above rotating-pressing operation type electronic part 10 is fitted. Each of pairs of partition walls 105, 106 is projected so as to regulate the position of the above rotating-pressing operation type electronic part 10 from a lower face edge portion of this opening portion 104. In particular, the above partition walls 105 push down terminal portions 33, 38 of contact pieces 30, 35 and terminal portions 57, 59 of a common contact piece 54 described later so that these terminal portions respectively come in press contact with connecting pads 112*a*, 112*b* and 113*a*, 113*b* of the print substrate 110 and are electrically connected to these connecting pads.

An unillustrated scroll bar is moved by operating the above rotating-pressing operation type electronic part 10 until predetermined desirable information data among information data displayed within the above monitor 107. Next, the predetermined desirable information data can be selected by pushing-down the above rotating-pressing operation type electronic part 10.

Figure 6:
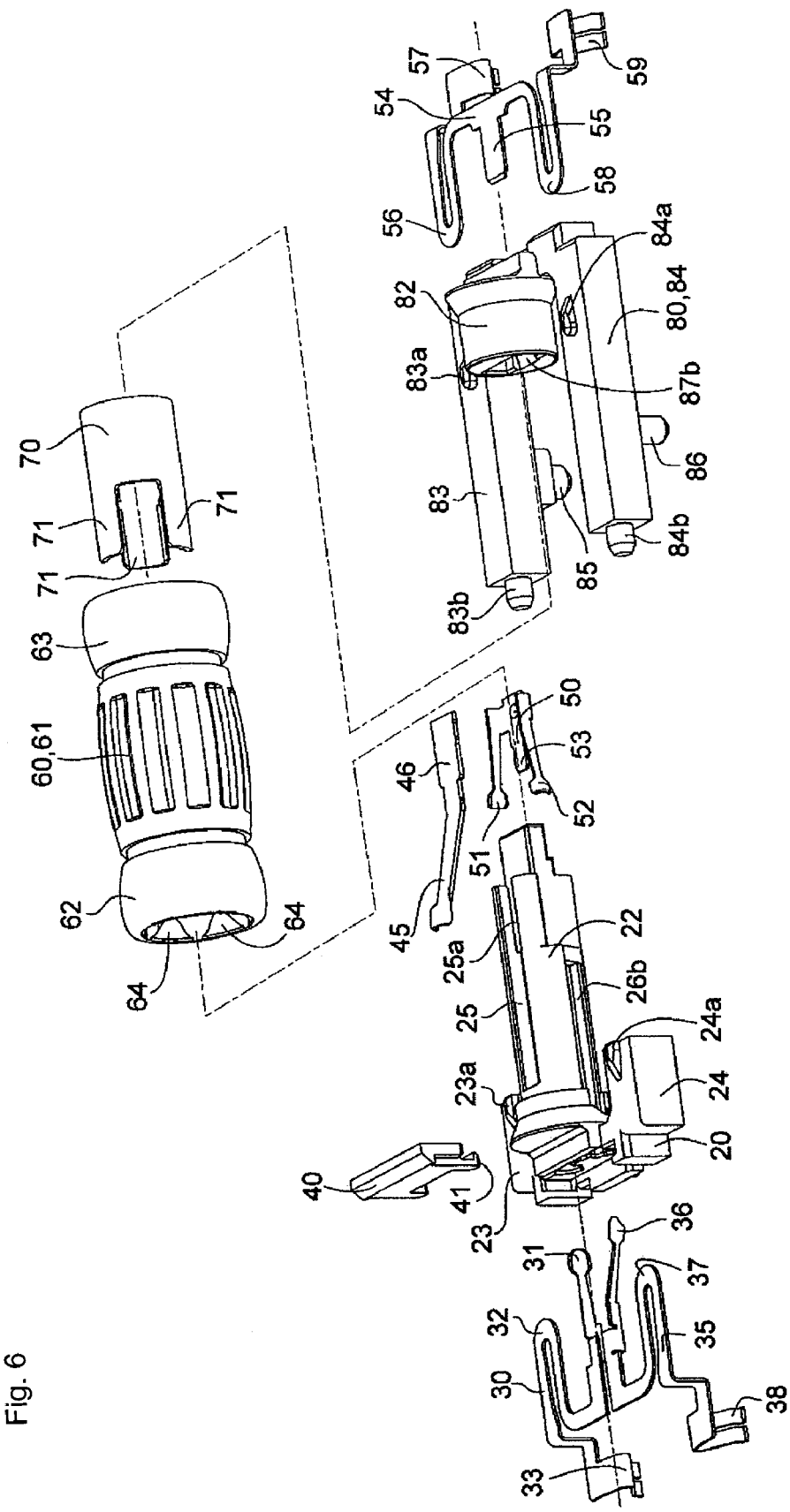
FIG. 6 is an exploded perspective view of the first embodiment mode shown in FIG. 4A.

As shown in FIG. 6, the above rotating-pressing operation type electronic part 10 is generally constructed by a first base 20, a rotating operation body 60 and a second base 80. First and second contact pieces 30, 35 for a rotating signal, a cover 40 for escape prevention, a spring 45 for an operating feel, and a common contact piece 50 for a rotating signal are assembled into the first base 20. A sleeve-shaped inner contact 70 is press-fitted into the rotating operation body 60. The common contact piece 54 for a rotating signal is assembled into the second base 80.

A push-down pin 21 (FIG. 4B) is projected on the lower face of the first base 20. Arm receiving portions 23, 24 are projected in parallel on both sides of a shaft portion 22 projected in a side direction of the first base 20. The above shaft portion 22 forms a guide groove 25 for press-fitting and fixing the spring 45 for an operating feel at the upper end of an outer circumferential face of the shaft portion 22. The shaft portion 22 also respectively forms guide grooves 26*a*, 26*b* (guide groove 26*a* is not shown in the drawings) for guiding elastic contact portions 31, 36 of the first and second contact pieces 30, 35 for a rotating signal on both side faces of the outer circumferential face of the shaft portion 22. Further, a press-fitting groove 27 (see FIG. 3B) able to press-fit the common contact piece for a rotating signal is formed on a tip face of the above shaft portion 22. On the other hand, positioning projections 23*a*, 24*a* are respectively formed in upper face tip edge portions of the above arm receiving portions 23, 24.

The above first and second contact pieces 30, 35 for a rotating signal mutually have a left-right symmetrical shape, and is constructed by elastic contact portions 31, 36 coming in slide contact with the inner circumferential face of an inner contact 70 described later, connecting portions 32, 37 for obtaining a predetermined desirable spring force, and terminal portions 33, 38 coming in elastic contact with connecting pads 112*a*, 112*b* of the print substrate 110. In particular, the above terminal portions 33, 38 are bent approximately in a V-shape at their free ends, and are divided into two portions. This is because the predetermined desirable spring force is secured and contact reliability is secured. The lengths of the above elastic contact portions 31, 36 are differently set so as not to come in contact with the same portion of the inner circumferential face of an extending portion 71 of the inner contact 70. Further, tip portions of the above elastic contact portions 31, 36 are curved to secure smooth operability. Further, the tip portions of the above elastic contact portions 31, 36 may be also divided into plural pieces to raise contact reliability.

The above cover 40 for escape prevention is arranged to prevent upward floating of the above first and second contact pieces 30, 35 inserted into the first base 20, and prevent escape of the first and second contact pieces 30, 35. Therefore, the above cover 40 prevents the escape of the above first and second contact pieces 30, 35 by engaging a pair of engaging claws 41, 42 arranged in a lower end portion of the cover 40 with a lower face edge portion of the above first base 20.

The spring 45 for an operating feel gives a click feeling to an operator by abutting on a projecting stripe 64 arranged in an inner circumferential face opening edge portion of the rotating operation body 60 described later. The above spring 45 is attached by press-fitting a wide width portion 46 arranged in one end portion into a slit 25*a* (FIG. 6) communicating with the above guide groove 25 from a side direction.

The common contact piece 50 for a rotating signal has a pair of elastic contact portions 51, 52 always coming in contact with the inner circumferential face of the inner contact 70 described later, and also has a tongue piece 53 for press-fitting able to be press-fitted into a slit 27 arranged on a tip face of the above shaft portion 22. The lengths of the above elastic contact portions 51, 52 are differently set so as not to come in contact with the same portion of the inner circumferential face of the above inner contact 70. Further, tip portions of the above elastic contact portions 31, 36 are curved to secure smooth operability. Further, the tip portions of the above elastic contact portions 31, 36 may be also divided into plural pieces to raise contact reliability.

Figure 10A:
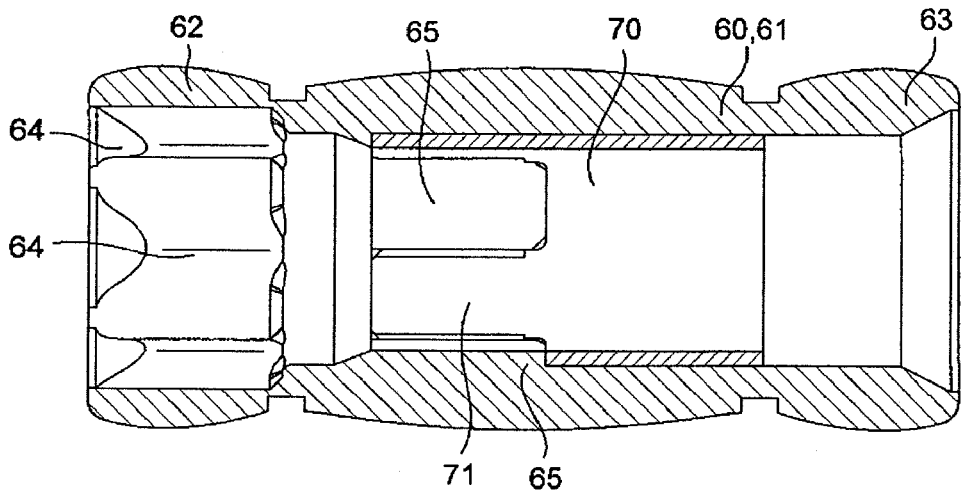
FIGS. 10A, 10B and 10C are a front sectional view, a side sectional view and a sectional perspective view, respectively, of a rotating operation body in the first embodiment mode.

The rotating operation body 60 is a sleeve body able to be inserted into the shaft portion 22 of the above first base 20. As shown in FIG. 10, a rotating operation portion 61 having irregular faces is formed in the central portion of an outer circumferential face of the rotating operation body 60. Pressing operation portions 62, 63 are respectively formed on both sides of the above rotating operation portion 61. Further, in the above rotating operation body 60, a projecting stripe 64 for obtaining a click feeling is formed in a one-side edge portion of the inner circumferential face of the rotating operation body 60. A step portion 65 is formed at a predetermined pitch in an intermediate portion of the inner circumferential face of the rotating operation body 60 (FIG. 10).

The inner contact 70 is constructed by a sleeve-shaped electric conductor, and an extending portion 71 is projected from a one-side edge portion of the inner contact 70 at a predetermined pitch in parallel with the axis.

Figure 10B:
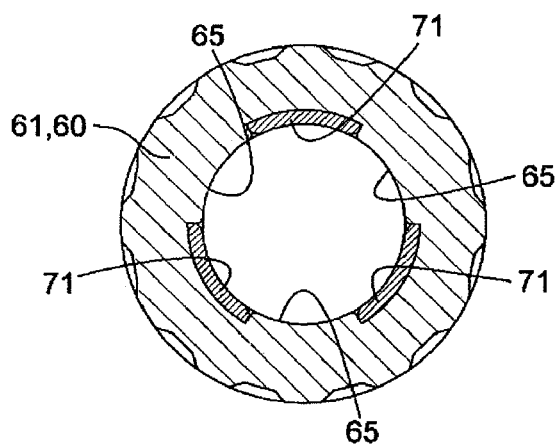
Figure 10C:
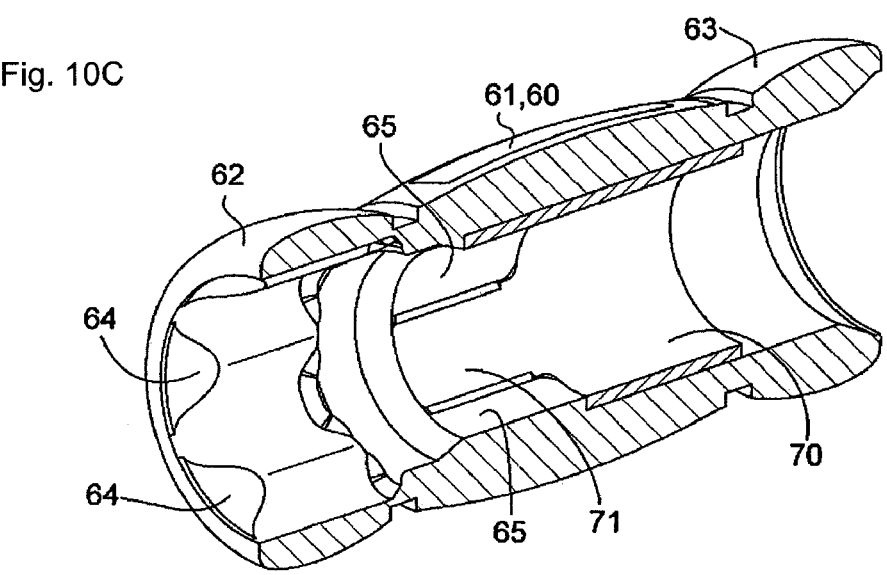
Figure 11:
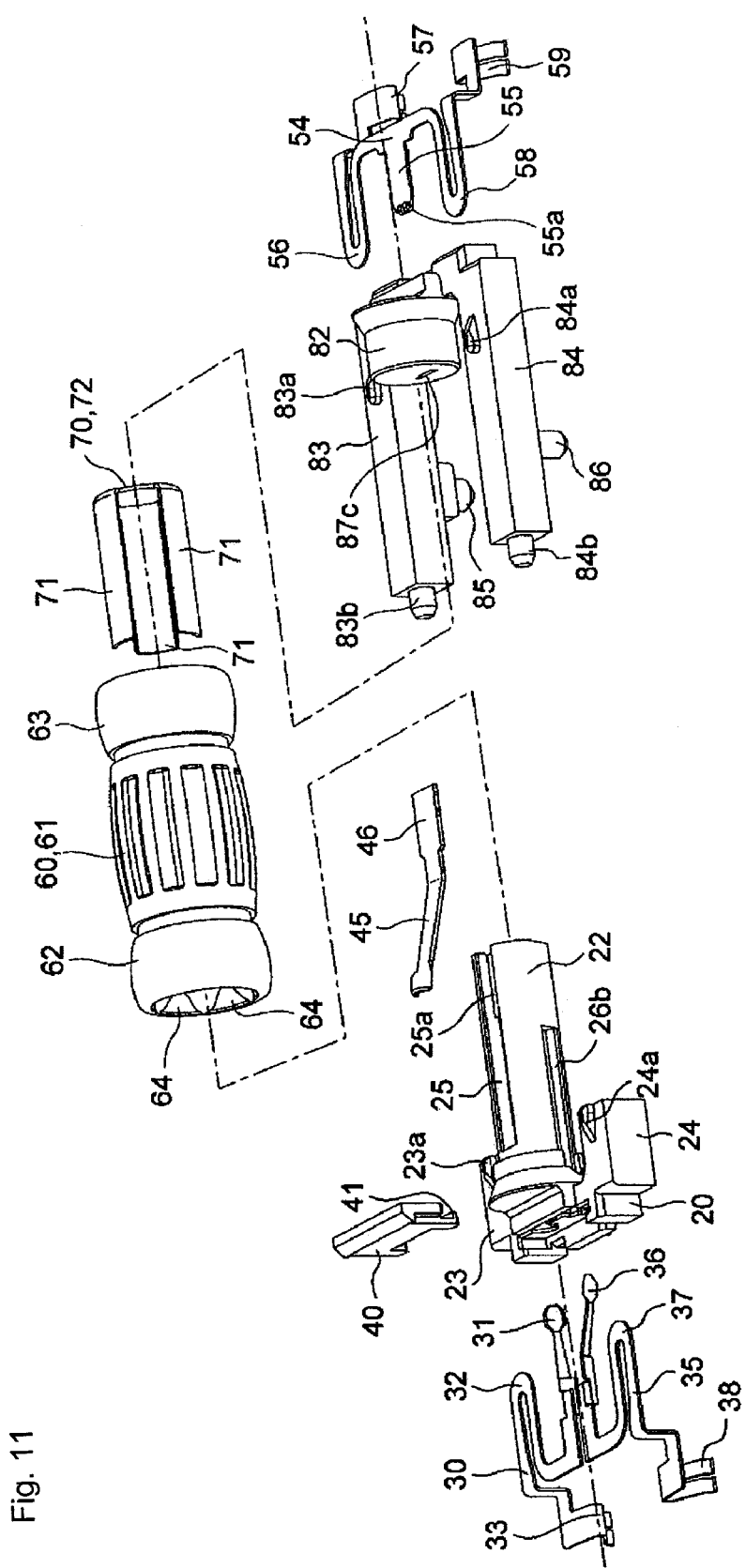
FIG. 11 is an exploded perspective view of a rotating-pressing operation type electronic part in accordance with a second embodiment mode.

The above step portion 65 is located between the above extending portions 71 by press-fitting to the inner circumferential face of the above rotating operation body 60, and the inner circumferential face of the extending portion 71 becomes the same face as the above step portion 65 so that no step difference is caused (FIG. 10B).

A push-down pin 81 (FIG. 4B) is projected on the lower face of the second base 80. On the other hand, a bearing portion 82 is integrally formed in the second base 80 so as to correspond to the above shaft portion 22. A pair of arm portions 83, 84 are projected in a side direction so as to respectively correspond to the arm receiving portions 23, 24 of the above first base 20. In the above arm portions 83, 84, positioning projections 83*a*, 84*a* are formed in an upper face base portion. Further, projecting portions 83*b*, 84*b* for fitting are formed on tip faces of the arm portions 83, 84. Further, a guide pin 85 with a pedestal is projected on the lower face of the above arm portion 83, and a guide pin 86 is projected on the lower face of the above arm portion 84. A slit 87*a* (FIG. 3B) able to press-fit a tongue piece 55 for connection in the common terminal 54 for a rotating signal is arranged on an outer directional face of the above bearing portion 82. On the other hand, a fitting hole 87*b* for fitting the above shaft portion 22 thereinto and communicating with the above slit 87*a* is arranged on an inner directional face of the bearing portion 82.

The above common terminal 54 for a rotating signal is constructed by a tongue piece 55 for connection, a pair of connecting portions 56, 58, and terminal portions 57, 59. The tongue piece 55 for connection comes in press contact with the above common contact piece 50 for a rotating signal, and is electrically connected to this common contact piece 50. The connecting portions 56, 58 extend from a base portion of this tongue piece 55 for connection. In the terminal portions 57, 59, free end portions of these connecting portions 56, 58 are approximately bent in a V-shape, and their tip portions are divided into two portions.

Figure 7:
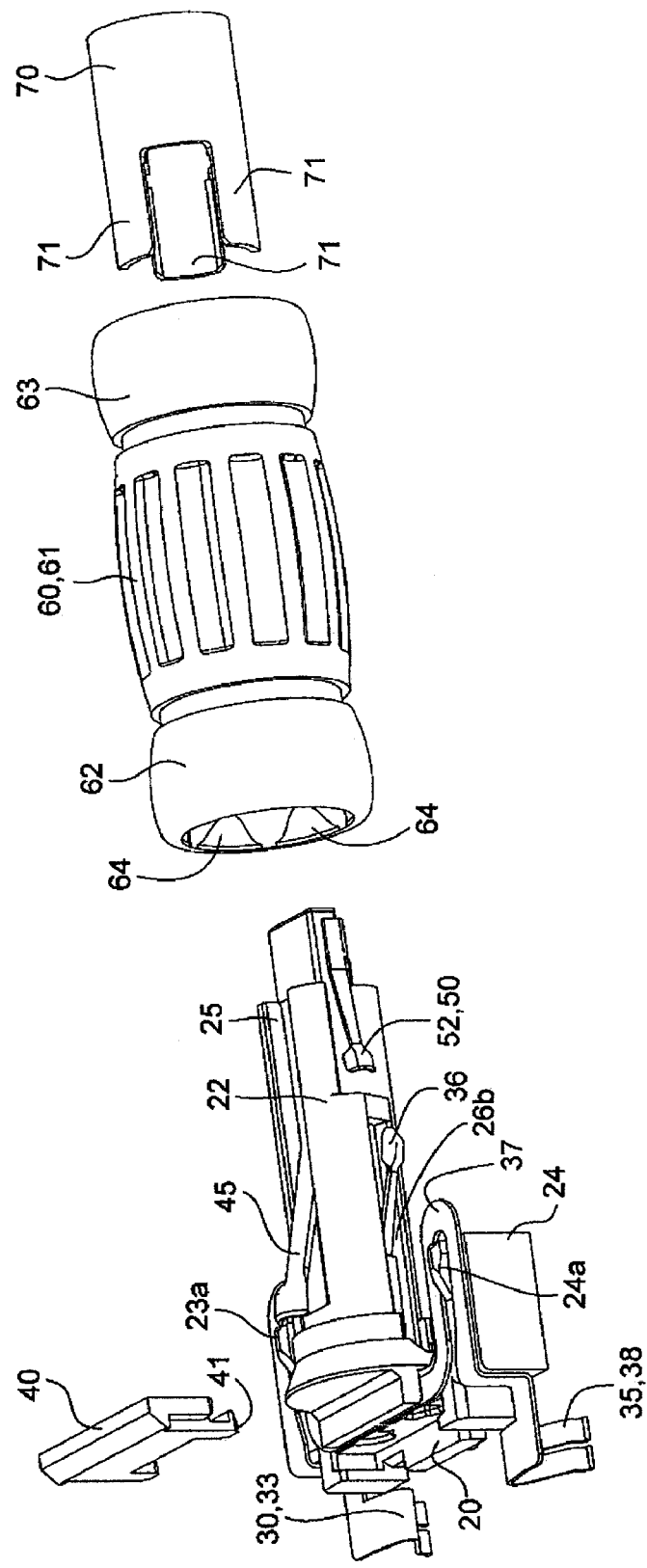
FIG. 7 is a perspective view for explaining the former half of an assembly process of the first embodiment mode.
Figure 8:
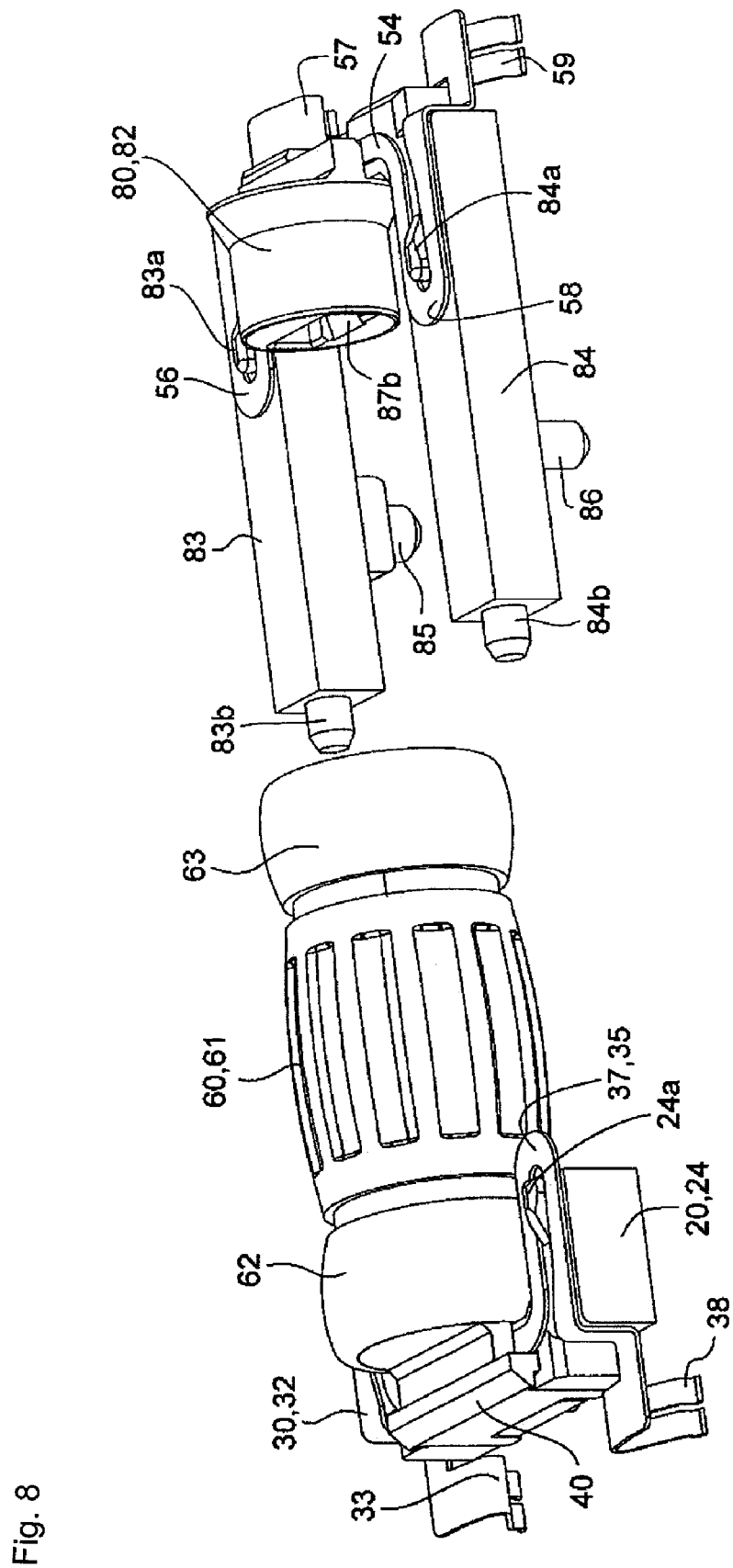
FIG. 8 is a perspective view for explaining the latter half of the assembly process of the first embodiment mode.

An assembly method of the rotating-pressing operation type electronic part 10 constructed by the above constructional parts will next be explained on the basis of FIGS. 7 and 8.

The elastic contact portions 31, 36 of the first and second contact pieces 30, 35 for a rotating signal are respectively inserted into the guide grooves 26*a*, 26*b* arranged on both sides of the outer circumferential face of the shaft portion 22 of the first base 20. The connecting portions 32, 37 are respectively engaged with the positioning projections 23*a*, 24*a* of the arm receiving portions 23, 24, and are positioned. Further, the wide width portion 46 of the spring 45 for an operating feel is press-fitted into the slit 25*a* of the guide groove 25 of the above shaft portion 22. The tongue piece 53 of the common contact piece 50 for a rotating signal is press-fitted and assembled into the slit 27 (FIG. 3B) of the above shaft portion 22. Next, the engaging claw 41 of the cover 40 for escape prevention is engaged with a lower face edge portion of the above first base 20 and is assembled so that escape of the common contact pieces 30, 35 for a rotating signal is prevented.

Figure 9A:
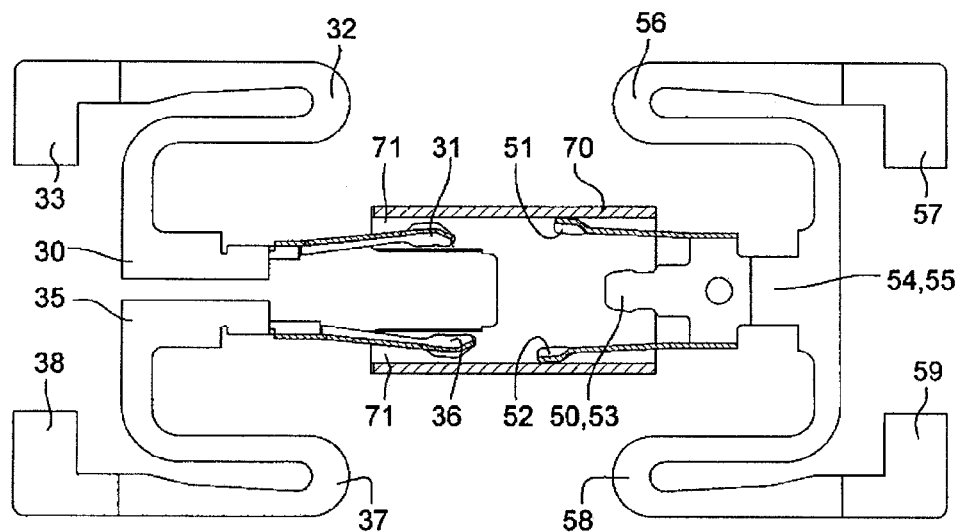
FIG. 9A is a plan sectional view for explaining a contact structure of the first embodiment mode.
Figure 9B:
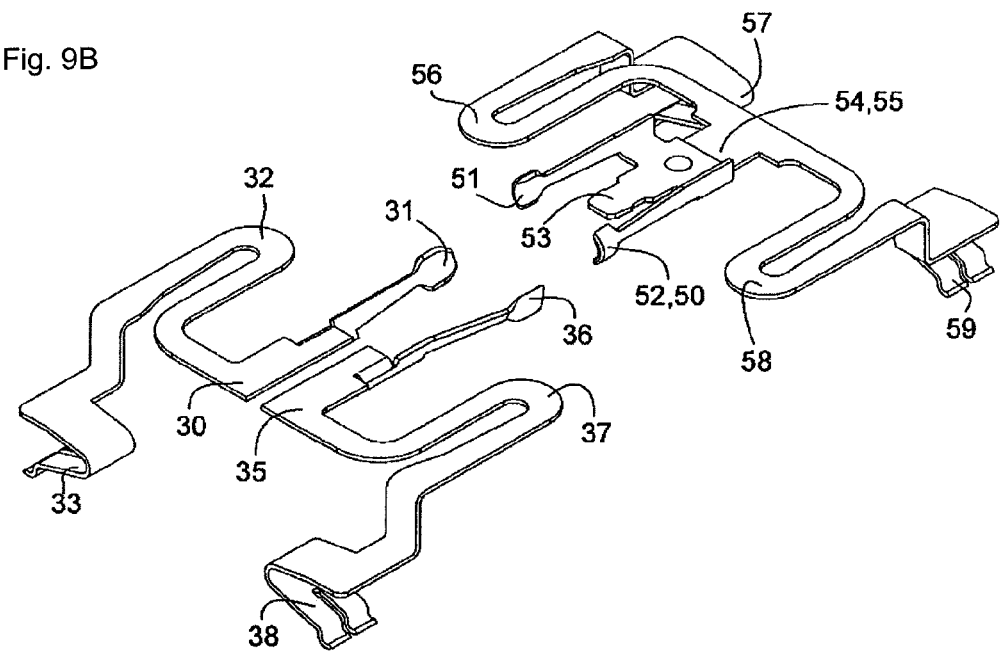
FIG. 9B is a perspective view for explaining the contact structure of the first embodiment mode.

Further, the shaft portion 22 of the first base 20 is inserted and assembled into the rotating operation body 60 press-fitting the inner contact 70 thereinto. Thus, the elastic contact portions 31, 36 of the first and second contact pieces 30, 35 for a rotating signal can respectively come in contact with the inner circumferential face of the extending portion 71 of the above inner contact 70. Further, the elastic contact portions 51, 52 of the above common contact piece 50 respectively always come in contact with a continuous inner circumferential face of the above inner contact 70 (FIG. 9B). Further, the spring 45 for an operating feel can abut on the projecting stripe 64 of the rotating operation body 60.

On the other hand, the connecting tongue piece 55 of the above common terminal 54 for a rotating signal is press-fitted into the bearing portion 82 of the second base 80, and the connecting portions 56, 58 are engaged with the positioning projections 83a, 84a of the arm portions 83, 84, and are assembled. The above bearing portion 82 is then inserted from an opening portion of one side of the rotating operation body 60, and the shaft portion 22 of the first base 20 is fitted into the fitting hole 87b of the bearing portion 82. Further, the projecting portions 83b, 84b for fitting in the arm portions 83, 84 are inserted into unillustrated fitting holes of the arm receiving portions 23, 24 of the first base 20, and are integrated. Therefore, the tongue piece 55 of the common terminal 54 comes in press contact with the common contact piece 50, and is electrically connected to this common contact piece 50 (FIG. 3B), and the above rotating operation body 60 is rotatably supported.

Figure 2A:
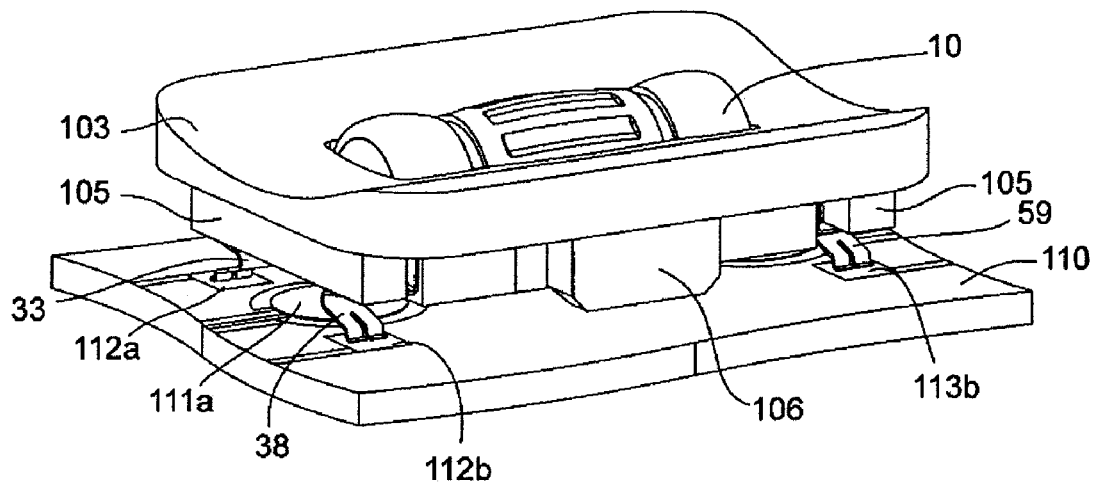
FIG. 2A is a perspective view of a main portion of FIG. 1.
Figure 2B:
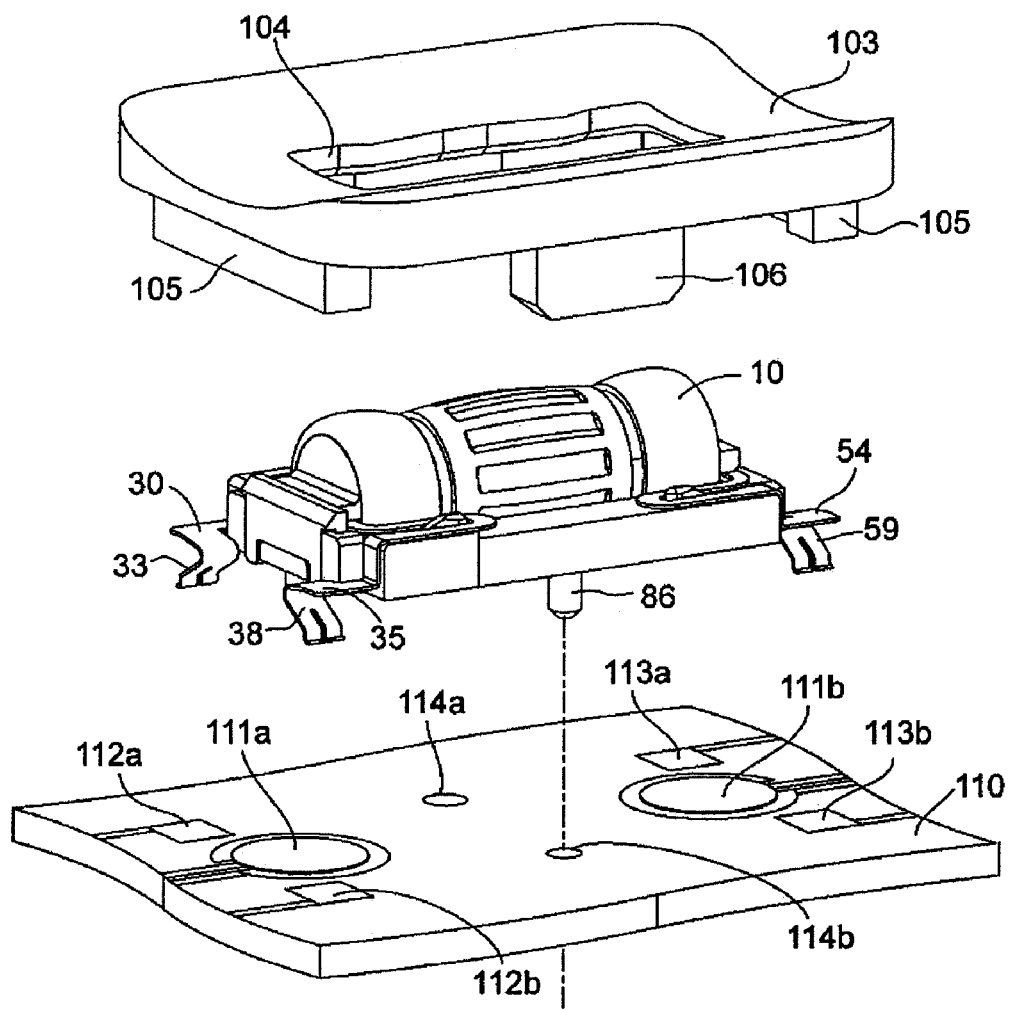
FIG. 2B is an exploded perspective view of FIG. 2A.
Figure 3A:
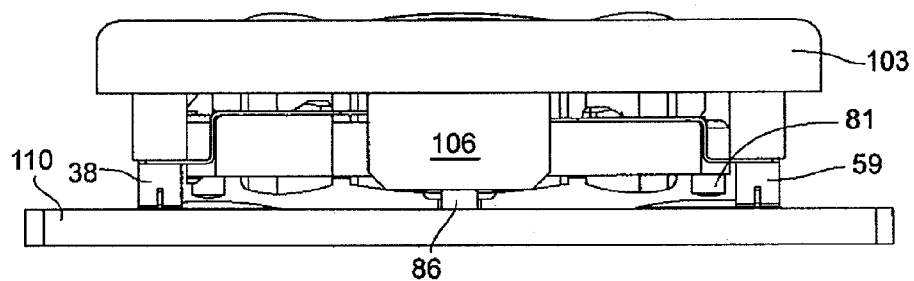
FIG. 3A is a front view of FIG. 2A.
Figure 3B:
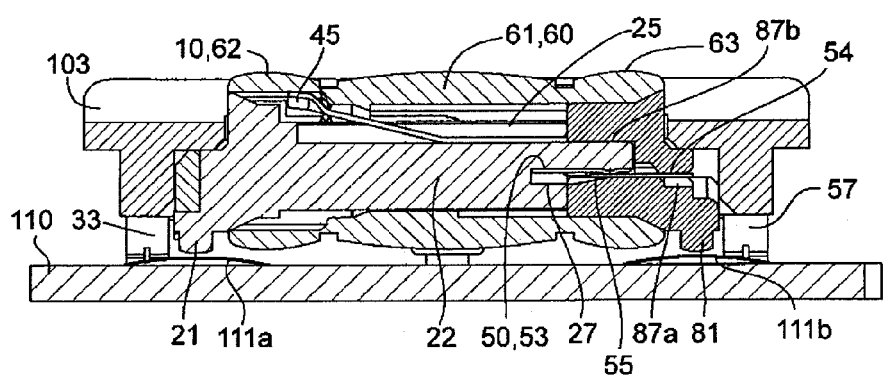
FIG. 3B is a cross-sectional view of FIG. 3A.
Figure 3C:
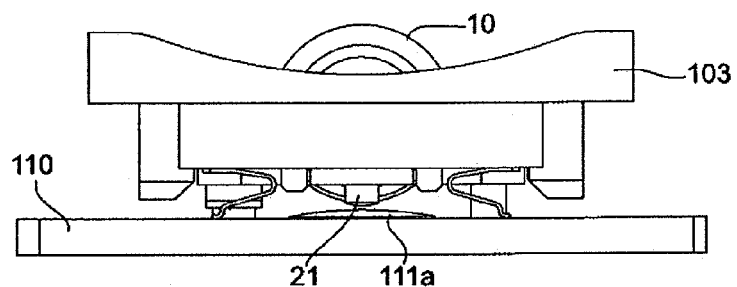
FIG. 3C is a left-hand side view of FIG. 2A.
Figure 3D:
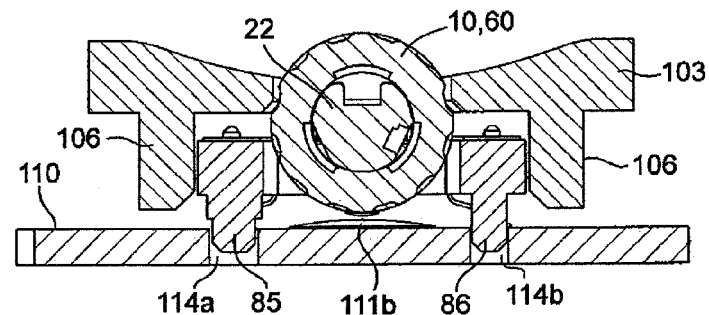
FIG. 3D is a cross-sectional view of FIG. 3C.
Figure 4A:
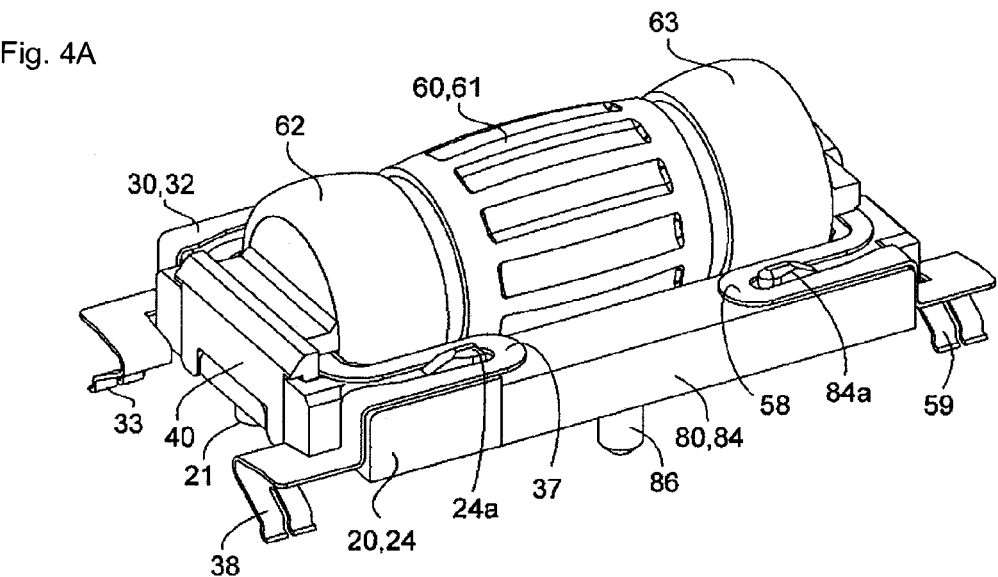
FIG. 4A is a perspective view of a rotating-pressing operation type electronic part in accordance with the first embodiment mode.
Figure 4B:
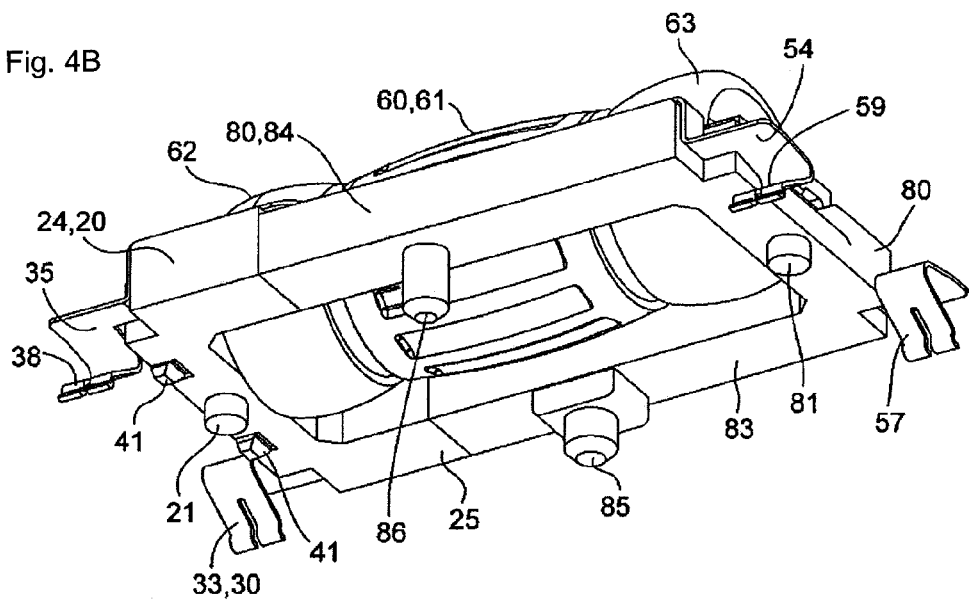
FIG. 4B is a perspective view of an angle different from that of FIG. 4A.
Figure 5A:
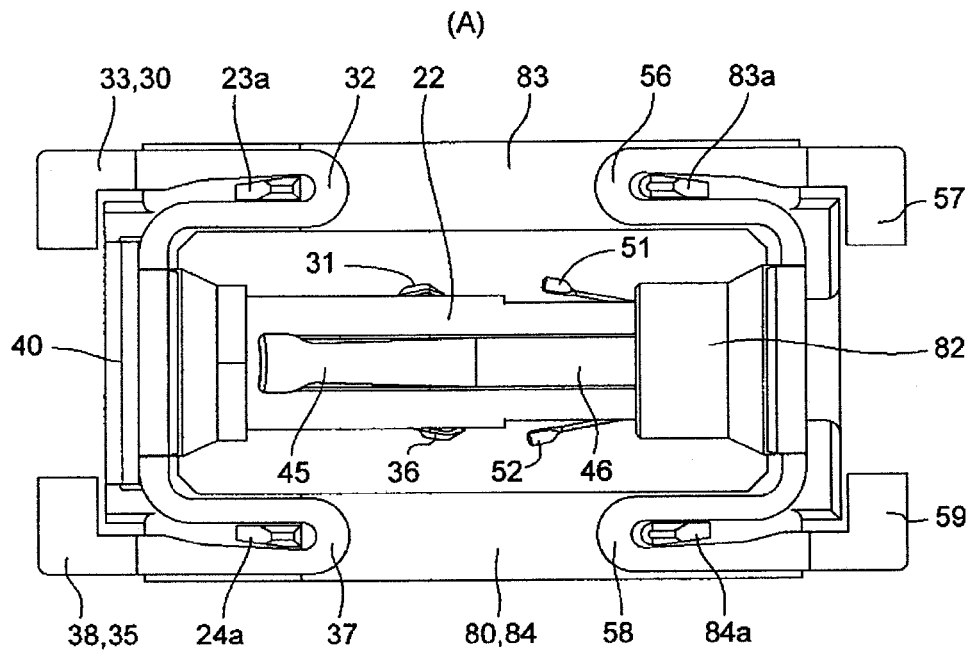
FIG. 5A is a plan view of the first embodiment mode removing a rotating operation body for reasons of convenience.
Figure 5B:
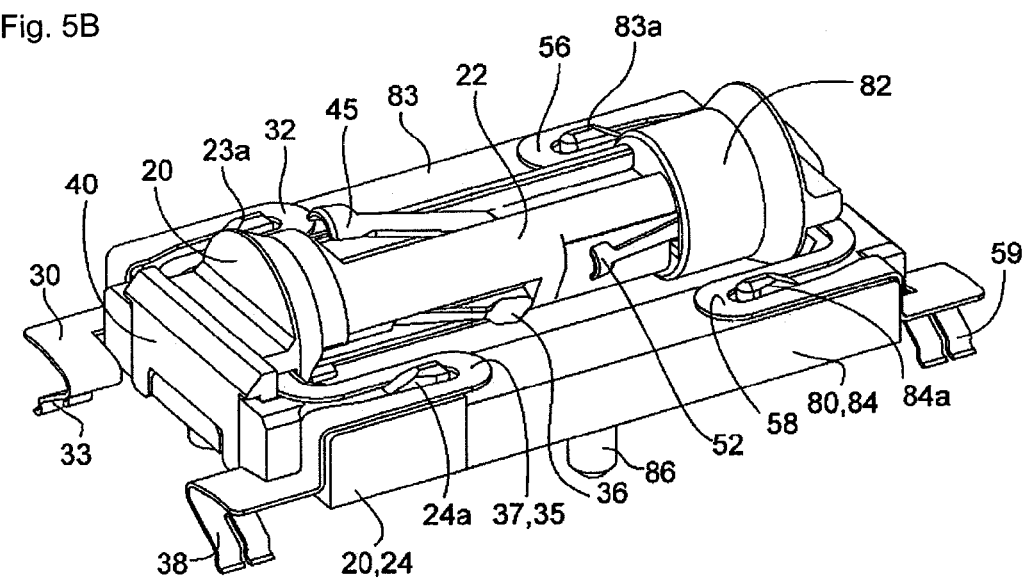
FIG. 5B is a perspective view of FIG. 5A.

As shown in FIG. 2, positioning pins 85, 86 of the second base 80 are respectively inserted into positioning holes 114a, 114b of the print substrate 110 attached into the portable telephone 100, and are positioned. Thus, push-down pins 21, 81 of the second base 80 respectively abut on push button switches 111a, 111b. Further, escape of the rotating-pressing operation type electronic part 10 is prevented by fitting the cover 103 into the opening portion 102 arranged in the housing 101 of the above portable telephone 100.

Next, the operation of the rotating-pressing operation type electronic part 10 assembled as mentioned above will be explained.

The elastic contact portions 51, 52 of the common contact piece 50 always come in contact with the inner contact 70. Each of the elastic contact portions 31, 36 of the first and second contact pieces 30, 35 for a rotating signal alternately repeats a contact state and a non-contact state with respect to the extending portion 71 of the above inner contact 70 by rotating the rotating operation body 60. Therefore, a rotating direction and a rotating amount of the above rotating operation body 60 can be detected by respectively outputting pulse signals when the contact state is attained. Next, detected data are converted through a unillustrated control circuit, and a detecting result is displayed as a movement of a scroll bar in the monitor 107 of the portable telephone 100. After predetermined desirable data are specified by the scroll bar, the rotating operation portion 61 of the rotating operation body 60 or the pressing operation portions 62, 63 are pushed down. Thus, the push button switches 111a, 111b mounted to the print substrate 110 are operated through the push-down pins 21, 81, and the predetermined desirable information data displayed in the monitor 107 are selected. Thereafter, the predetermined desirable information data can be selected and determined by moving the scroll bar displayed in the monitor 107 by repeating similar operations.

In accordance with this embodiment mode, the terminal portions 33, 38 of the first and second contact pieces for a rotating signal and the terminal portions 57, 59 of the common terminal 54 respectively come in direct contact with the connecting pads 112a, 112b and 113a, 113b of the print substrate 110. Therefore, the rotating-pressing operation type electronic part 10 having a small number of parts and a small number of assembly works and having a small height size is obtained. Since the base portion and the attaching plate as in the conventional example are not particularly required, the rotating-pressing operation type electronic part 10 having a small floor area is obtained. As this result, there is an advantage able to raise the integration density of other electronic parts in the print substrate 110.

As shown in FIGS. 11 to 16, a second embodiment mode shows a case in which the common terminal 54 comes in direct contact with the inner contact 70.

Namely, in the inner contact 70, an extending portion 71 is projected at a predetermined pitch from an outer circumferential edge portion of a contact portion 72 of a disk shape in parallel with the axis. On the other hand, elastic contact portions 55a, 55a are formed in eccentric positions in a tip edge portion of the tongue piece 55 of the common terminal 54.

Figure 12:
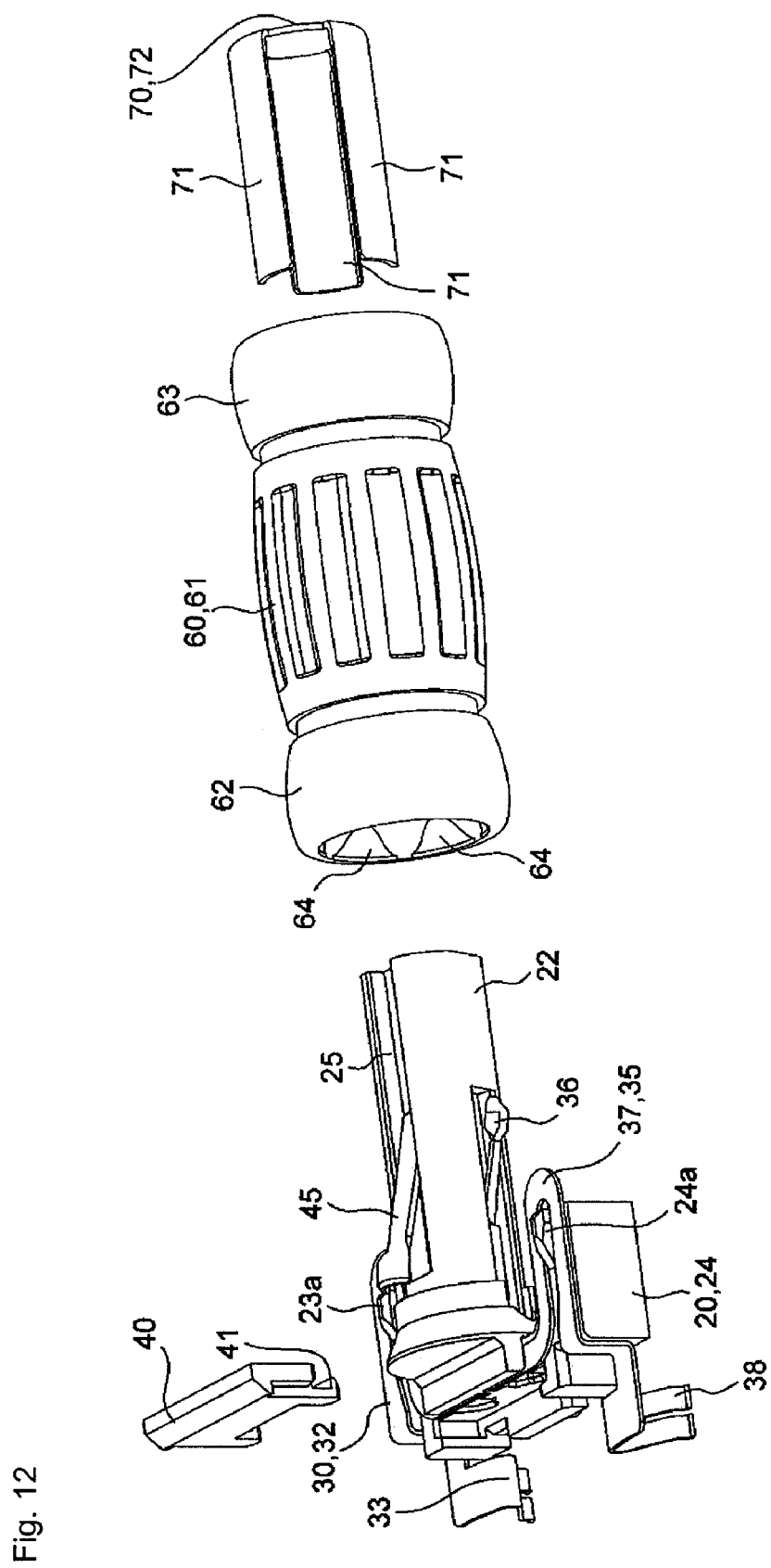
FIG. 12 is a perspective view for explaining the former half of an assembly process of the second embodiment mode.

Therefore, similar to the above first embodiment mode, as shown in FIG. 12, the shaft portion 22 of the first base 20 is inserted and assembled into the rotating operation body 60 (FIG. 16) press-fitting the inner contact 70 thereinto. Thus, the elastic contact portions 31, 36 of the first and second contact pieces 30, 35 for a rotating signal respectively come in contact with an inner circumferential face of the extending portion 71 of the above inner contact 70.

Figure 13:
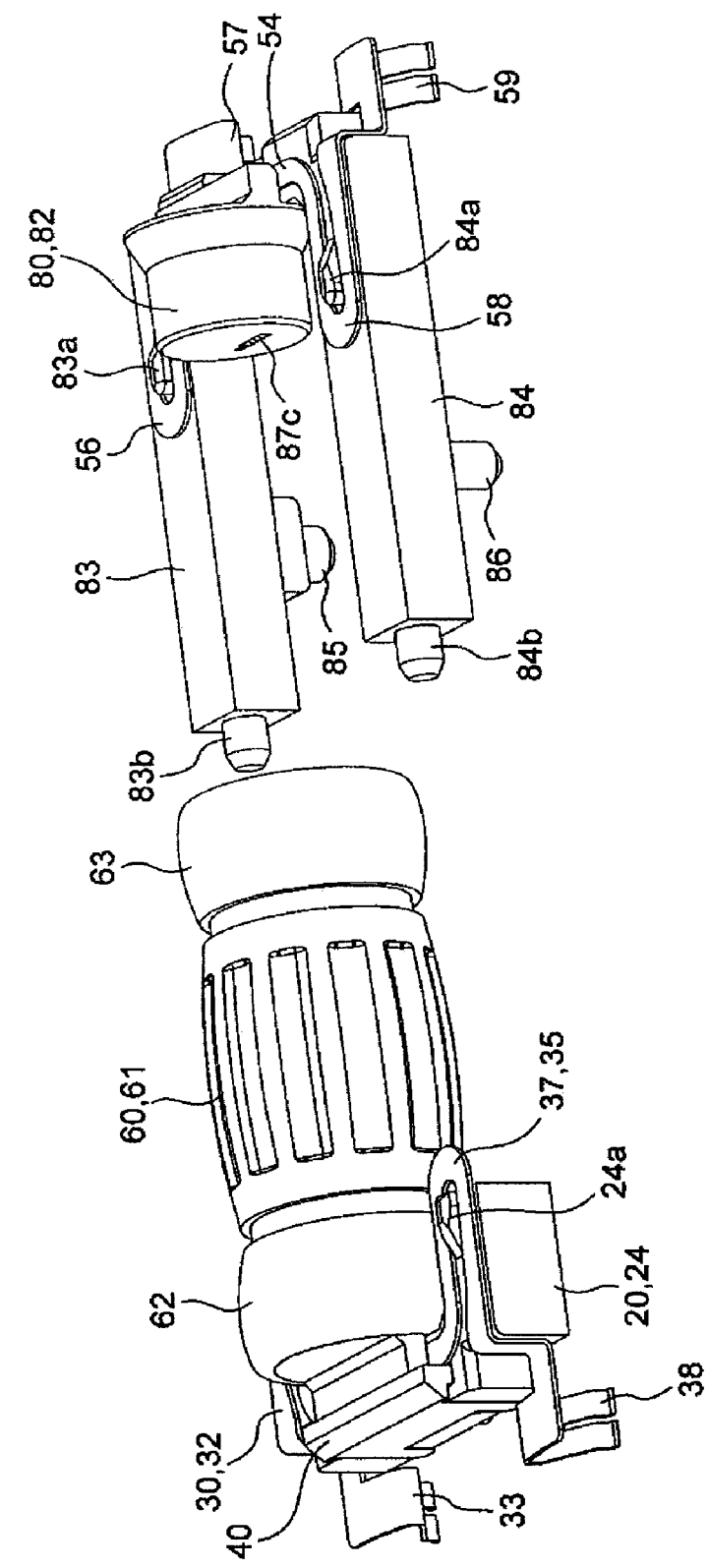
FIG. 13 is a perspective view for explaining the latter half of the assembly process of the second embodiment mode.
Figure 14A:
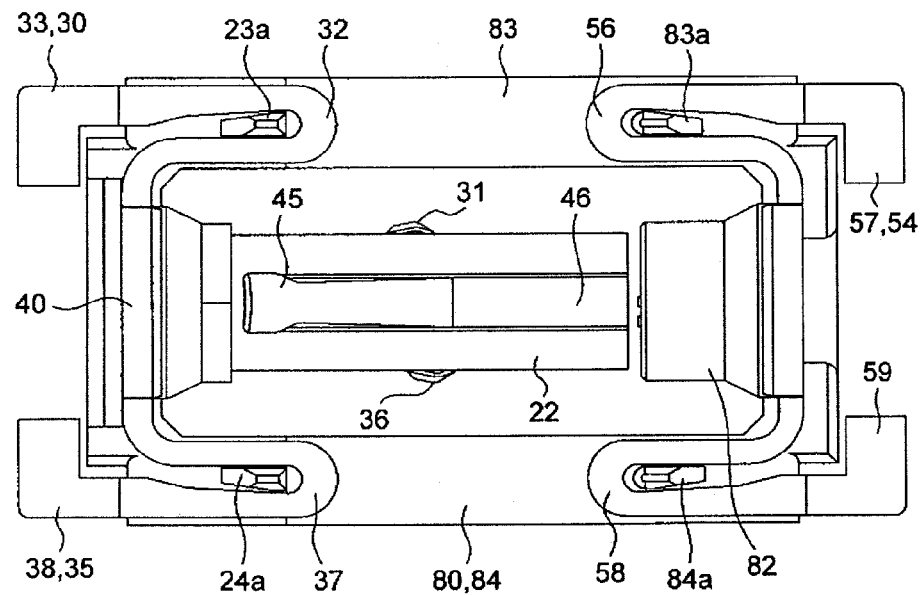
FIG. 14A is a plan view of the second embodiment mode removing a rotating operation body for reasons of convenience.
Figure 14B:
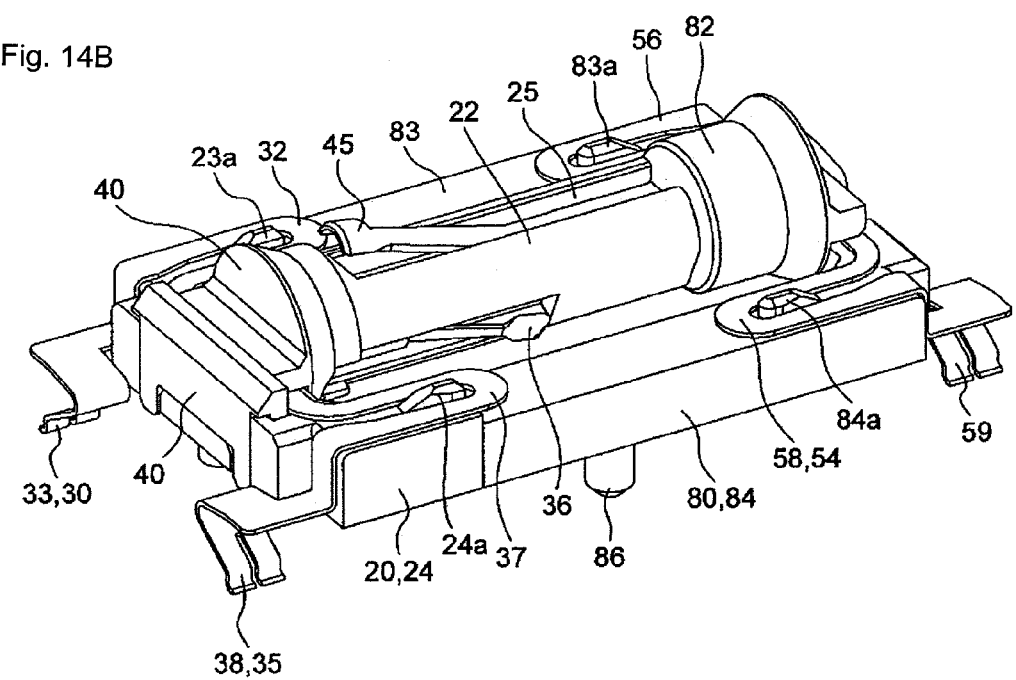
FIG. 14B is a perspective view of FIG. 14A.
Figure 15A:
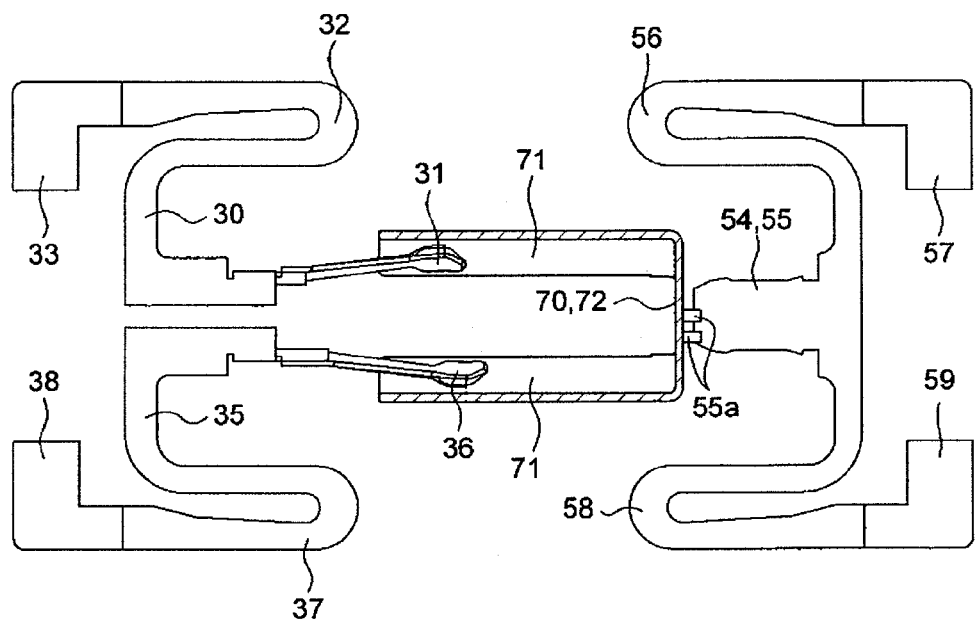
FIGS. 15A and 15B are a plan sectional view and a perspective view of a contact structure in the second embodiment mode.
Figure 15B:
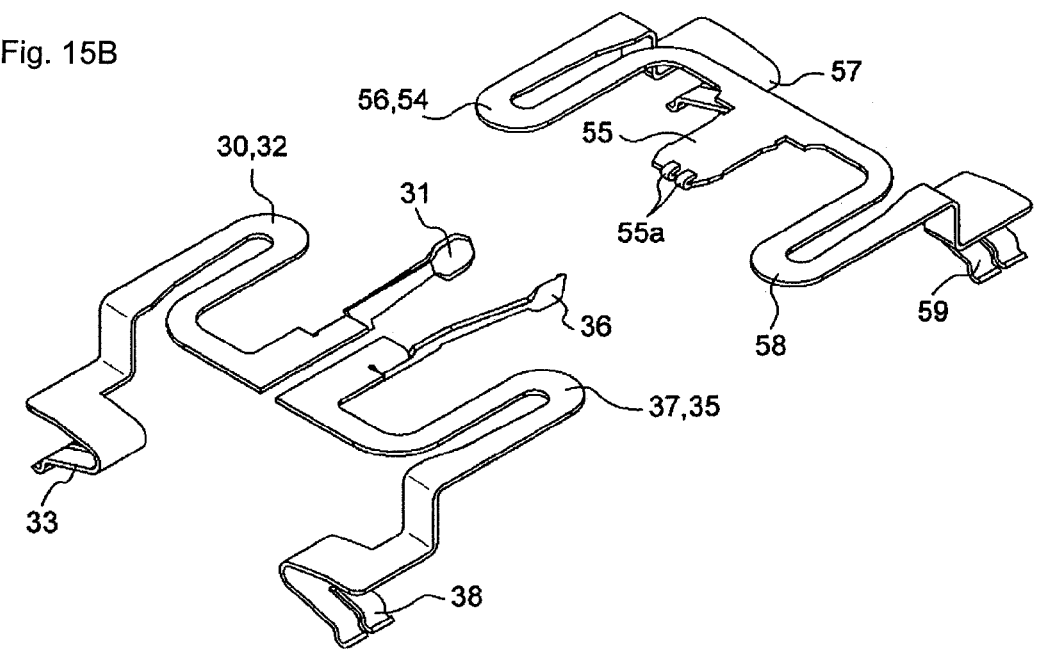
Figure 16A:
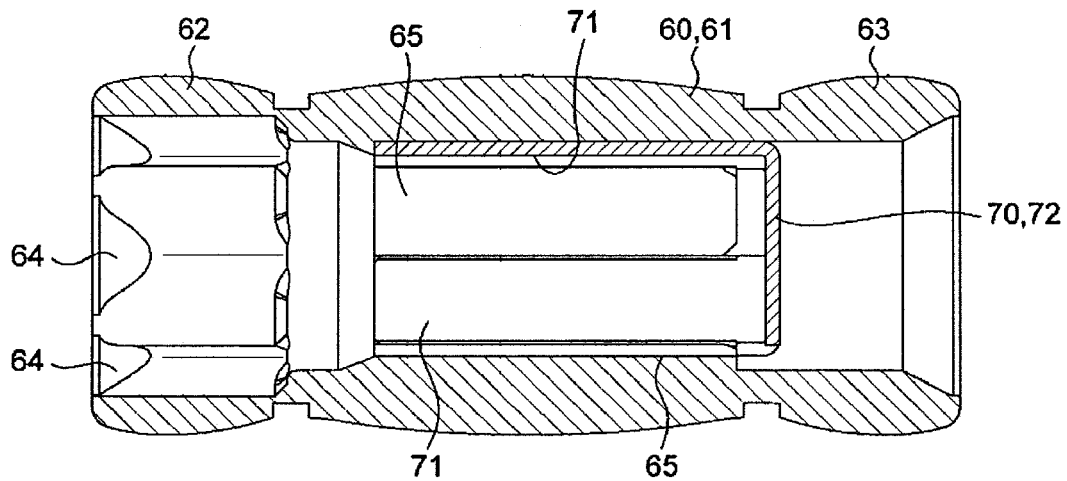
FIGS. 16A, 16B and 16C are a front sectional view, a side sectional view and a sectional perspective view, respectively, of the rotating operation body in the second embodiment mode.
Figure 16B:
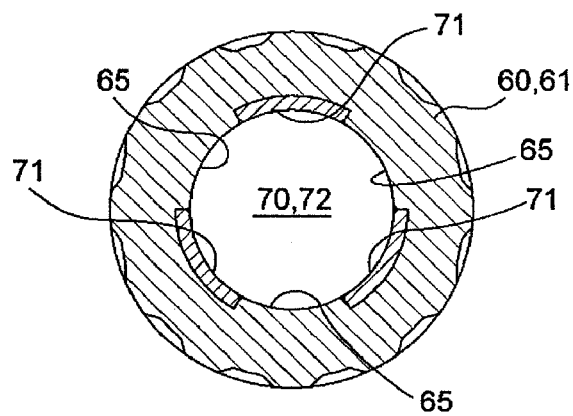
Figure 16C:
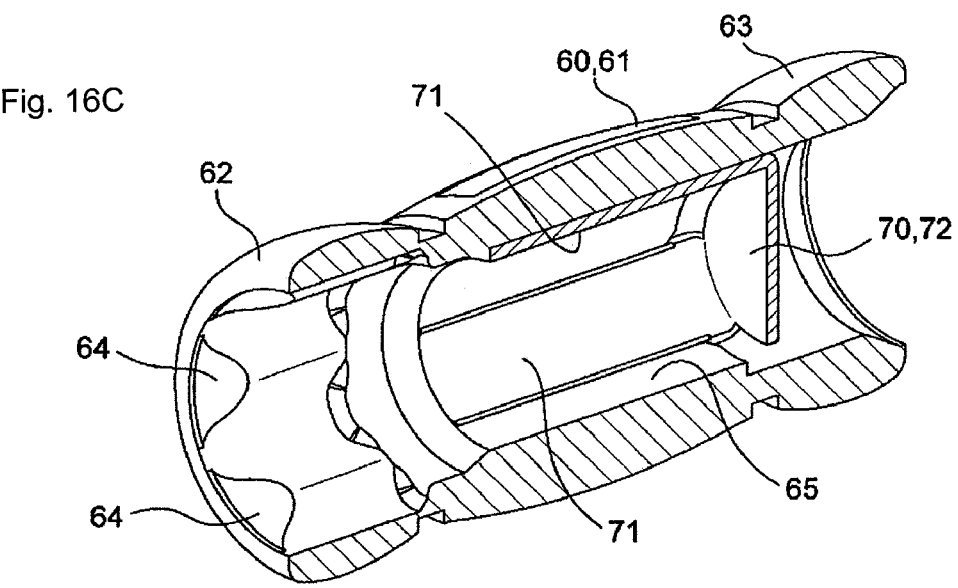

On the other hand, as shown in FIG. 13, a connecting tongue piece 55 of the above common terminal 54 for a rotating signal is press-fitted into a press-fitting hole 87c of the bearing portion 82 of the second base 80. Further, connecting portions 56, 58 are engaged with positioning projections 83a, 84a of the arm portions 83, 84, and are assembled. The above bearing portion 82 is then inserted from an opening portion of one side of the rotating operation body 60. Projecting portions 83b, 84b for fitting in the arm portions 83, 84 are inserted into unillustrated fitting holes of the arm receiving portions 23, 24 of the first base 20, and are integrated, and the above rotating operation body 60 is rotatably supported. Therefore, the elastic contact portions 55a, 55a arranged in the tongue piece 55 of the common terminal 54 come in contact with a contact portion 72 of the above inner contact 70 (FIG. 15A).

In accordance with this embodiment, there are advantages in that the above common contact piece 50 is not required, and the number of parts and the number of assembly works are reduced and productivity is further improved.

Since the other portions are approximately similar to those of the first embodiment mode, their explanations are omitted.

Figure 17:
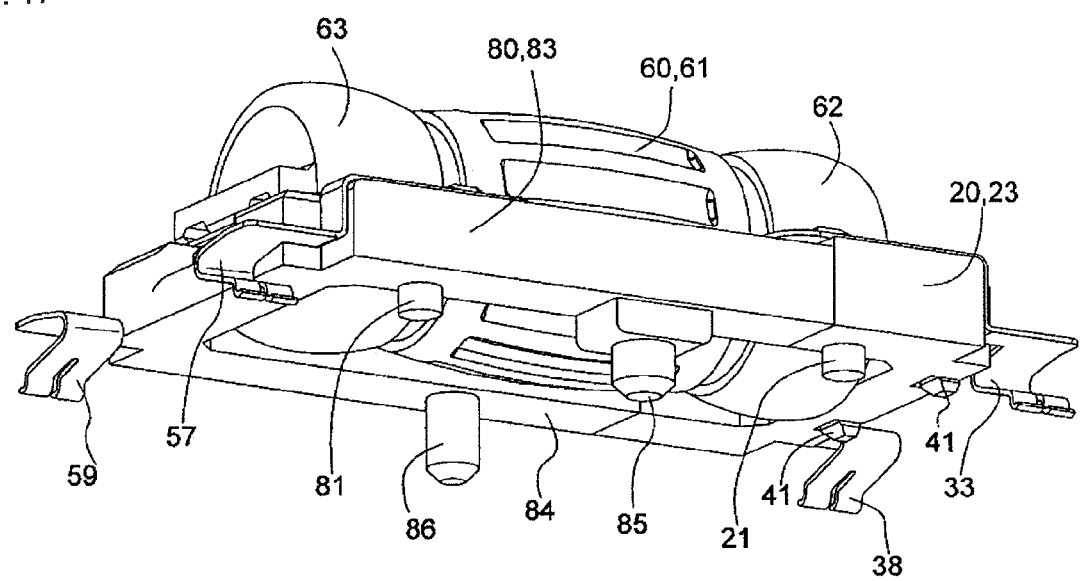
FIG. 17 is a perspective view of a rotating-pressing operation type electronic part in accordance with a third embodiment mode.
Figure 18A:
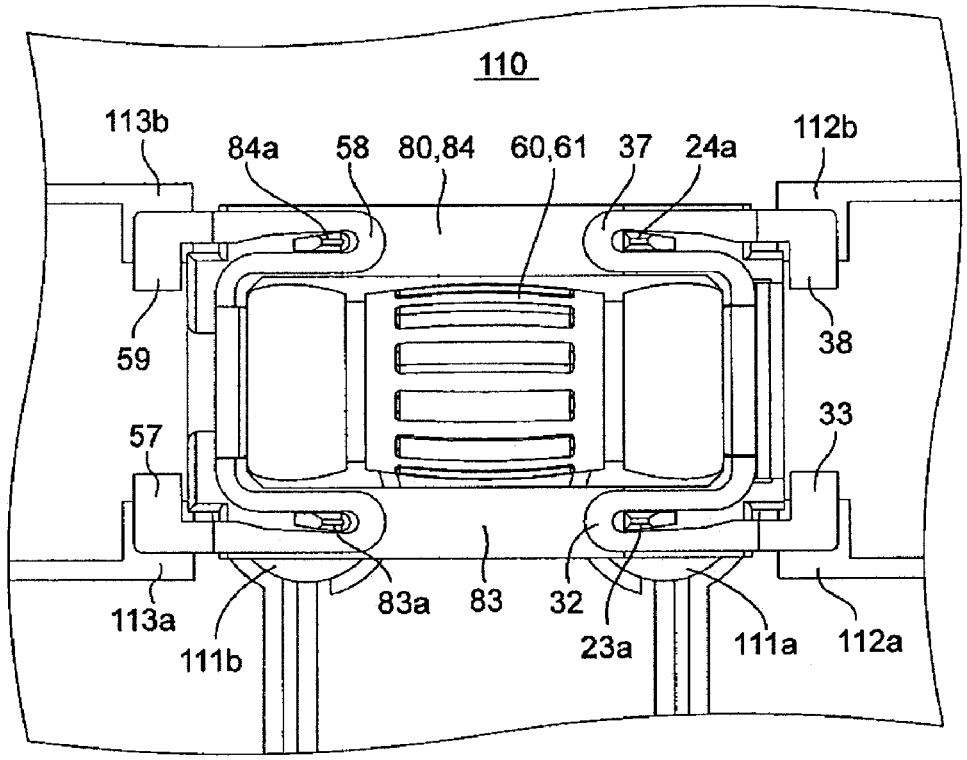
FIGS. 18A, 18B and 18C are a plan view, a front view and a right-hand side sectional view, respectively, showing a case in which the rotating-pressing operation type electronic part of the third embodiment mode is mounted to a print substrate.
Figure 18B:
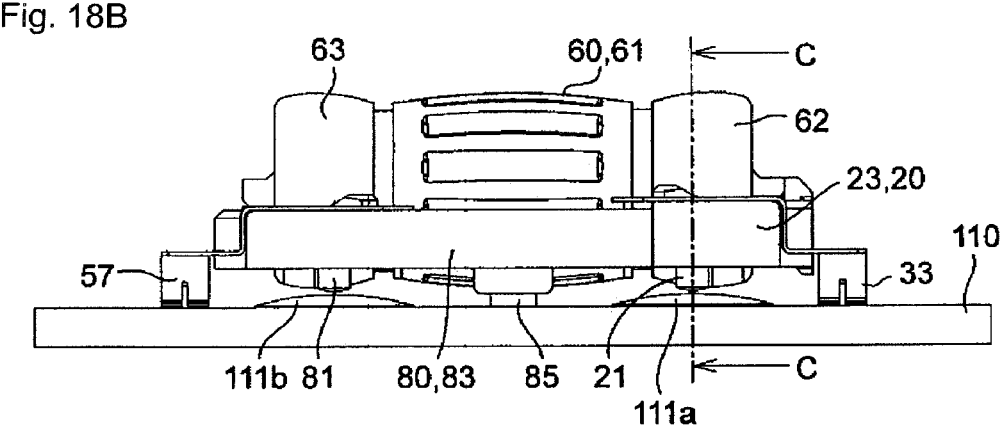
Figure 18C:
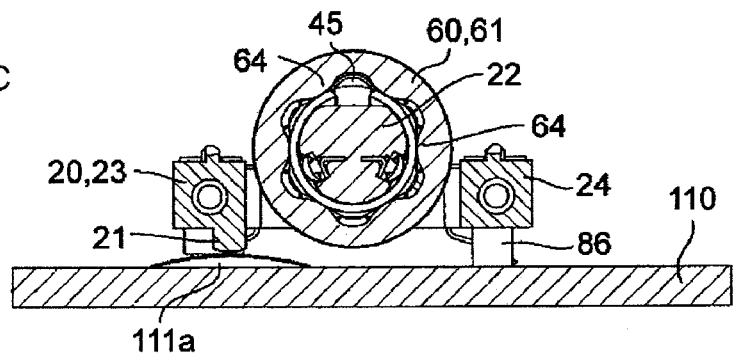

As shown in FIGS. 17 and 18, a third embodiment mode shows a case in which push-down pins 21 and 81 are respectively projected on the lower faces of an arm receiving portion 23 of the first base 20 and an arm portion 83 of the second base 80.

In accordance with this embodiment mode, since the push-down pins 21, 81 are arranged on the side opposed to an operator's hand, there are advantages in that the operator easily turns on and off the push button switches 111a, 111b by one thumb and operability is improved. Since the other portions are similar to those of the above first embodiment mode, their explanations are omitted.

Figure 19A:
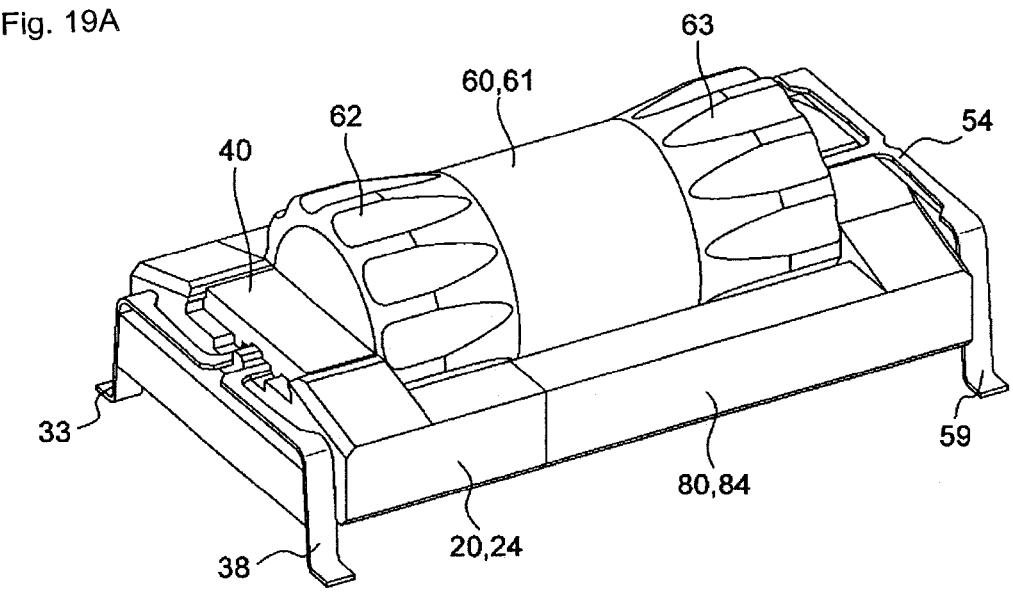
FIGS. 19A and 19B are perspective views of a rotating-pressing operation type electronic part in accordance with a fourth embodiment mode when this rotating-pressing operation type electronic part is visually seen from a different angle.
Figure 19B:
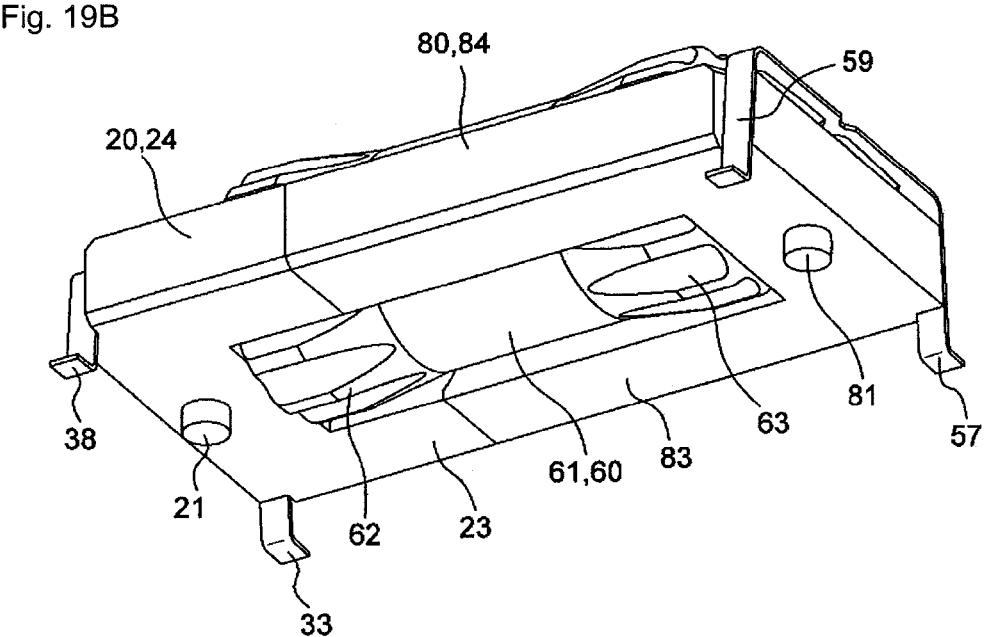
Figure 20A:
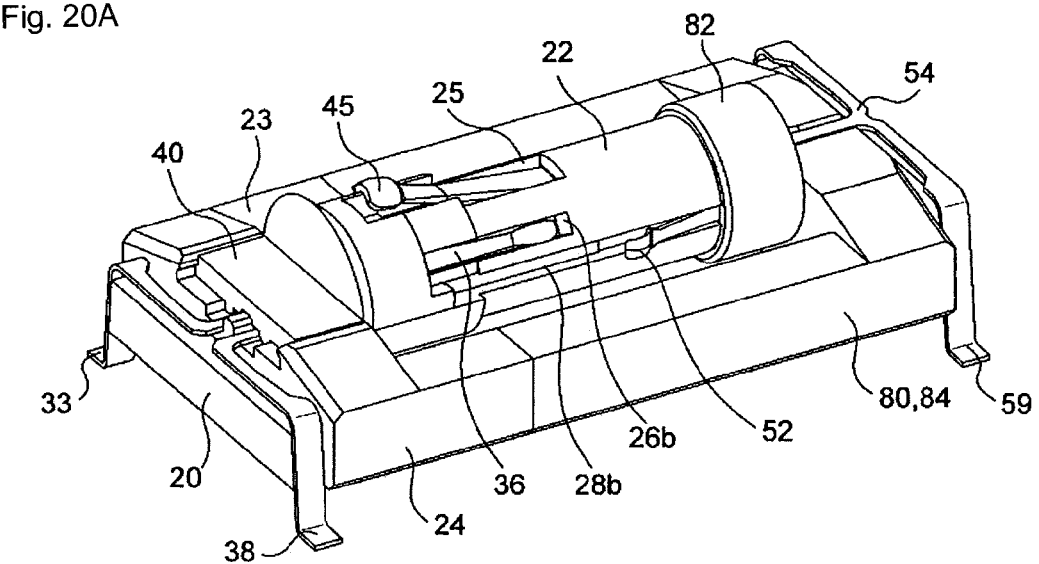
FIG. 20A is a perspective view of the fourth embodiment mode removing a rotating operation body for reasons of convenience.
Figure 20B:
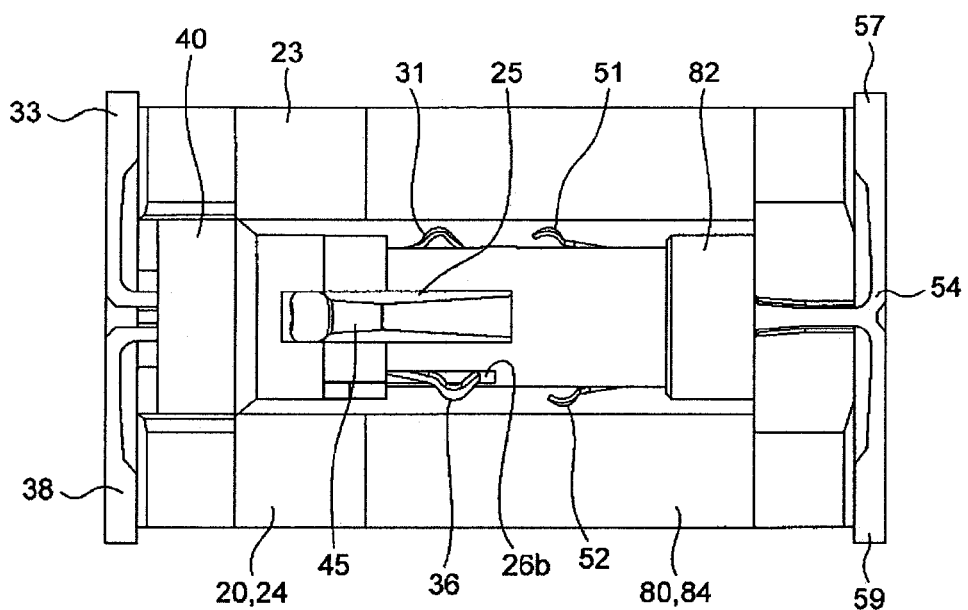
FIG. 20B is a plan view of FIG. 20A.
Figure 21:
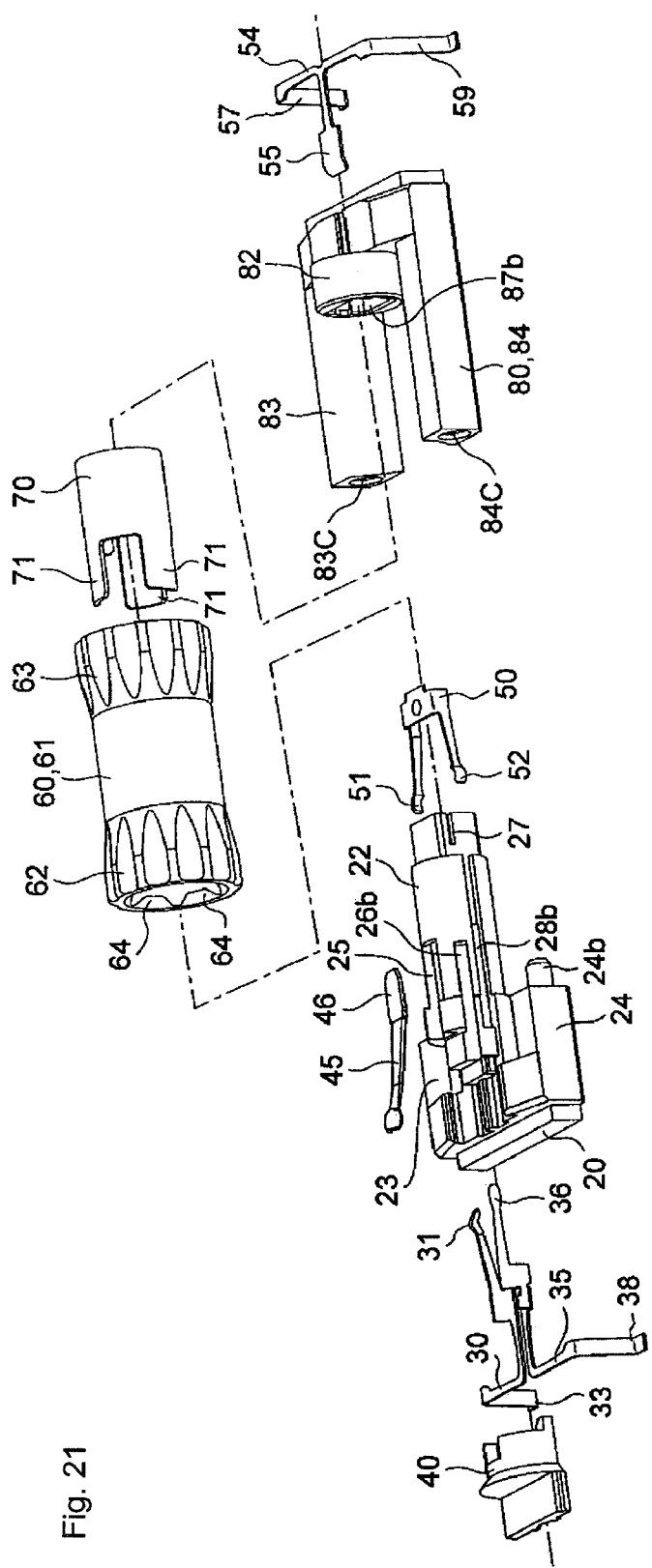
FIG. 21 is a perspective view of the rotating-pressing operation type electronic part in accordance with the fourth embodiment mode.

As shown in FIGS. 19 to 21, a fourth embodiment mode shows a case used by soldering onto the surface of the print substrate 110. Points greatly different from the above first embodiment mode will be explained.

Namely, in the first base 20, as shown in FIG. 21, arm receiving portions 23, 24 are projected in parallel on both sides of the shaft portion 22 projected in a side direction. A guide groove 25 for press-fitting and fixing the spring 45 for an operating feel is formed at an outer circumferential face upper end of the above shaft portion 22. Guide grooves 26a, 26b (guide groove 26a is not shown in the drawings) for guiding the contact portions 31, 36 of the first and second contact pieces 30, 35 for a rotating signal are respectively formed on both sides of the above guide groove 25. Further, a press-fitting groove 27 able to press-fit the common contact piece 50 for a rotating signal is formed on a tip face of the above shaft portion 22. Guide grooves 28a, 28b (guide groove 28a is not shown in the drawings) for guiding the elastic contact portions 51, 52 of the common contact piece 50 are arranged on both sides of the outer circumferential face of the shaft portion 22. On the other hand, no positioning projection is arranged in upper face edge portions of the above arm receiving portions 23, 24, but projecting portions 23b, 24b for fitting (no projecting portion 23b for fitting is shown in the drawings) are projected on tip faces of the arm receiving portions 23, 24.

The above first and second contact pieces 30, 35 for a rotating signal mutually have a left-right symmetrical shape, and are constructed by elastic contact portions 31, 36 coming in slide contact with the inner circumferential face of an inner contact 70 described later, and terminal portions 33, 38 for soldering to the connecting pads 112a, 112b of the print substrate 110. The lengths of the above elastic contact portions 31, 36 are differently set so as not to come in contact with the same portion of the inner circumferential face of an extending portion of the inner contact 70.

Upward floating of the above first and second contact pieces 30, 35 is prevented and escape is prevented by inserting and fixing the above cover 40 for escape prevention from a side end face of the first base 20.

The common contact piece 50 for a rotating signal has a pair of elastic contact portions 51, 52 always coming in contact with the inner circumferential face of the inner contact 70 described later. The lengths of the above elastic contact portions 51, 52 are differently set so as not to come in contact with the same portion of the inner circumferential face of the above inner contact 70.

As shown in FIGS. 19 and 20, the rotating operation body 60 is a sleeve body able to be inserted into the shaft portion 22 of the above first base 20, and a rotating operation portion 61 is formed in the central portion of the outer circumferential face of the rotating operation body 60. Pressing operation portions 62, 63 constructed by irregular faces are respectively formed on both sides of the above rotating operation portion 61. Further, a projecting stripe 64 for obtaining a click feeling is formed in a one-side edge portion of the inner circumferential face of the above rotating operation body 60. An unillustrated step portion is formed at a predetermined pitch in an intermediate portion of this inner circumferential face of the rotating operation body 60.

The inner contact 70 is constructed by a sleeve-shaped electric conductor, and an extending portion 71 is projected from a one-side edge portion of the inner contact 70 at a predetermined pitch in parallel with the axis.

The above step portion 65 is located between the above extending portions 71 by press-fitting to the inner circumferential face of the above rotating operation body 60. Similar to the first embodiment mode, the inner circumferential face of the extending portion 71 becomes the same face as the above step portion 65 so that no step difference is caused.

A push-down pin 81 (FIG. 19B) is projected on the lower face of the second base 80. On the other hand, a bearing portion 82 is integrally formed in the second base 80 so as to correspond to the above shaft portion 22. A pair of arm portions 83, 84 are projected in a side direction so as to respectively correspond to the arm receiving portions 23, 24 of the above first base 20. Holes 83c, 84c for fitting are formed on tip faces of the above arm portions 83, 84. Further, an unillustrated slit able to press-fit the tongue piece 55 for connection in the common terminal 54 for a rotating signal is arranged on an outer directional face of the above bearing portion 82. On the other hand, a fitting hole 87b for fitting the above shaft portion 22 and communicating with the above slit is arranged on an inner directional face of the bearing portion 82.

The above common terminal 54 for a rotating signal is constructed by a tongue piece 55 for connection coming in press contact with the above common contact piece 50 for a rotating signal and electrically connected to this common contact piece 50, and a pair of terminal portions 57, 59 extending from a base portion of this tongue piece 55 for connection.

Next, an assembly method of the rotating-pressing operation type electronic part 10 constructed by the above constructional parts will be explained.

Elastic contact portions 31, 36 of the first and second contact pieces 30, 35 for a rotating signal are respectively inserted into guide grooves 26a, 26b arranged on both sides of the outer circumferential face of the shaft portion 22 of the first base 20, and are positioned. Further, a wide width portion 46 of the spring 45 for an operating feel is press-fitted into the guide groove 25 of the above shaft portion 22, and the common contact piece 50 for a rotating signal is press-fitted into the slit 27 of the above shaft portion 22, and elastic contact portions 51, 52 are assembled into guide grooves 28a, 28b. Next, escape of the common contact pieces 30, 35 for a rotating signal is prevented by assembling a cover 40 for escape prevention to a side end face of the above first base 20 from a side direction.

Further, the shaft portion 22 of the first base 20 is inserted and assembled into the rotating operation body 60 press-fitting the inner contact 70 thereinto. Thus, the elastic contact portions 31, 36 of the first and second contact pieces 30, 35 for a rotating signal can respectively come in contact with the inner circumferential face of the extending portion 71 of the above inner contact 70. Further, the elastic contact portions 51, 52 of the above common contact piece 50 respectively always come in contact with a continuous inner circumferential face of the above inner contact 70. Further, the above spring 45 for an operating feel can abut on the projecting stripe 64 of the rotating operation body 60.

On the other hand, the connecting tongue piece 55 of the above common terminal 54 for a rotating signal is press-fitted and assembled into the bearing portion 82 of the second base 80. The above bearing portion 82 is then inserted from an opening portion of one side of the rotating operation body 60, and the shaft portion 22 of the first base 20 is fitted into the fitting hole 87b of the bearing portion 82. Projecting portions 23b, 24b for fitting in the arm receiving portions 23, 24 of the first base 20 are then inserted into holes 83c, 84c for fitting in the arm portions 83, 84, and are integrated. Therefore, the tongue piece 55 of the common terminal 54 comes in press contact with the common contact piece 50, and is electrically connected to this common contact piece 50, and the above rotating operation body 60 is rotatably supported.

Terminal portions 33, 38 and 57, 59 are then respectively positioned and soldered to connecting pads 112a, 112b and 113a, 113b of the print substrate illustrated in the first embodiment mode. Thus, push-down pins 21, 81 of the first base 20 and the second base 80 respectively abut on push button switches 111a, 111b. Since the other portions are approximately similar to those of the above first embodiment mode, their explanations are omitted.

Figure 22A:
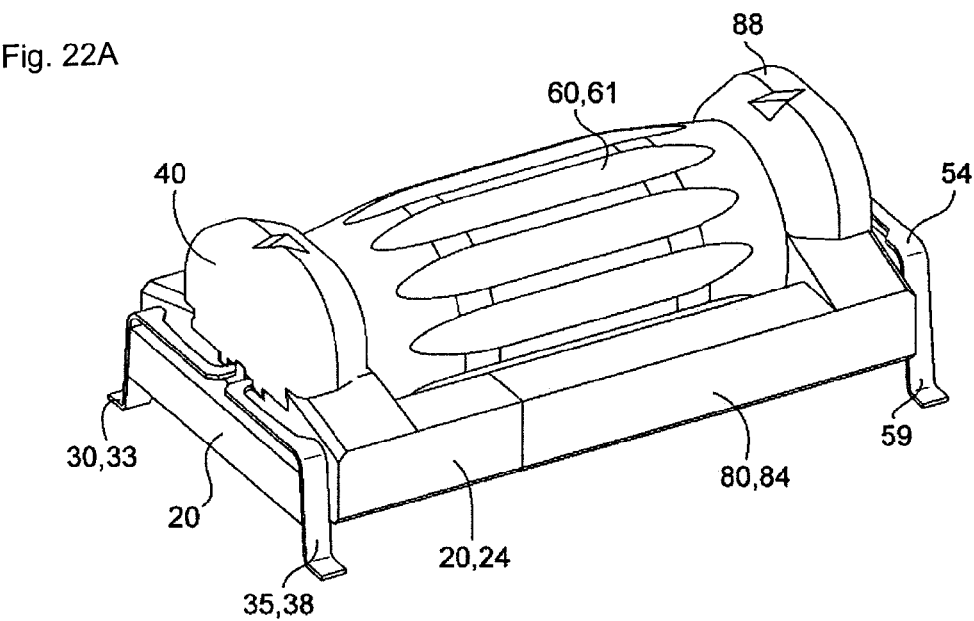
FIGS. 22A and 22B are perspective views of a rotating-pressing operation type electronic part in accordance with a fifth embodiment mode when this rotating-pressing operation type electronic part is visually seen from a different angle.
Figure 22B:
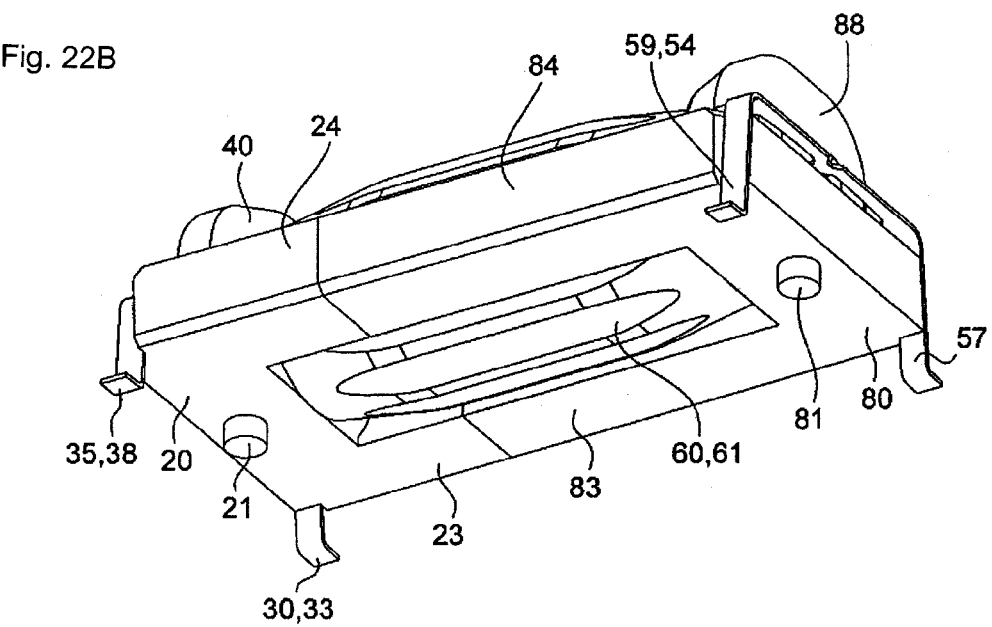
Figure 23A:
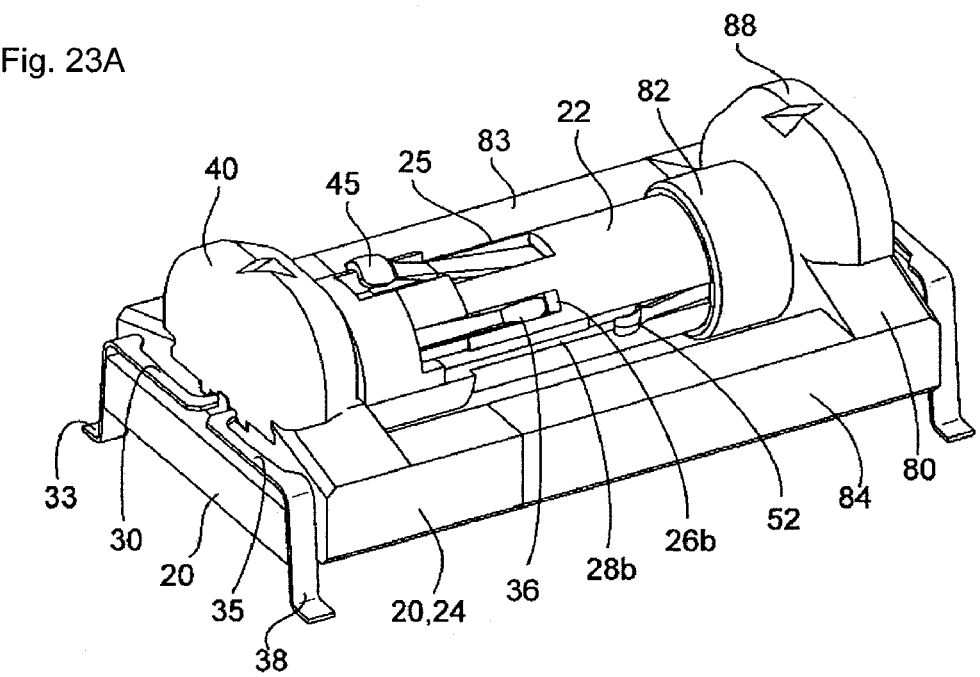
FIG. 23A is a perspective view of the fifth embodiment mode removing a rotating operation body for reasons of convenience.
Figure 23B:
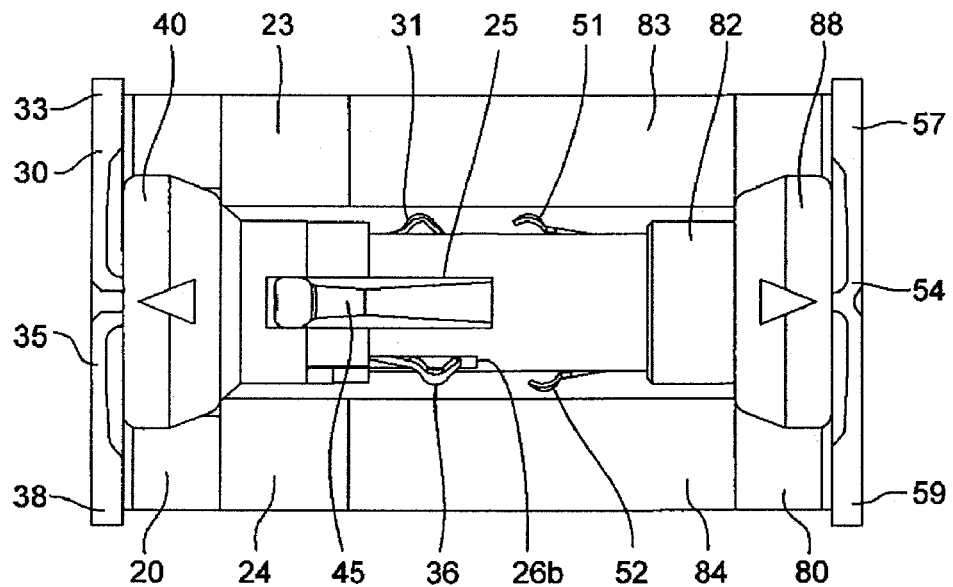
FIG. 23B is a plan view of FIG. 23A.
Figure 24:
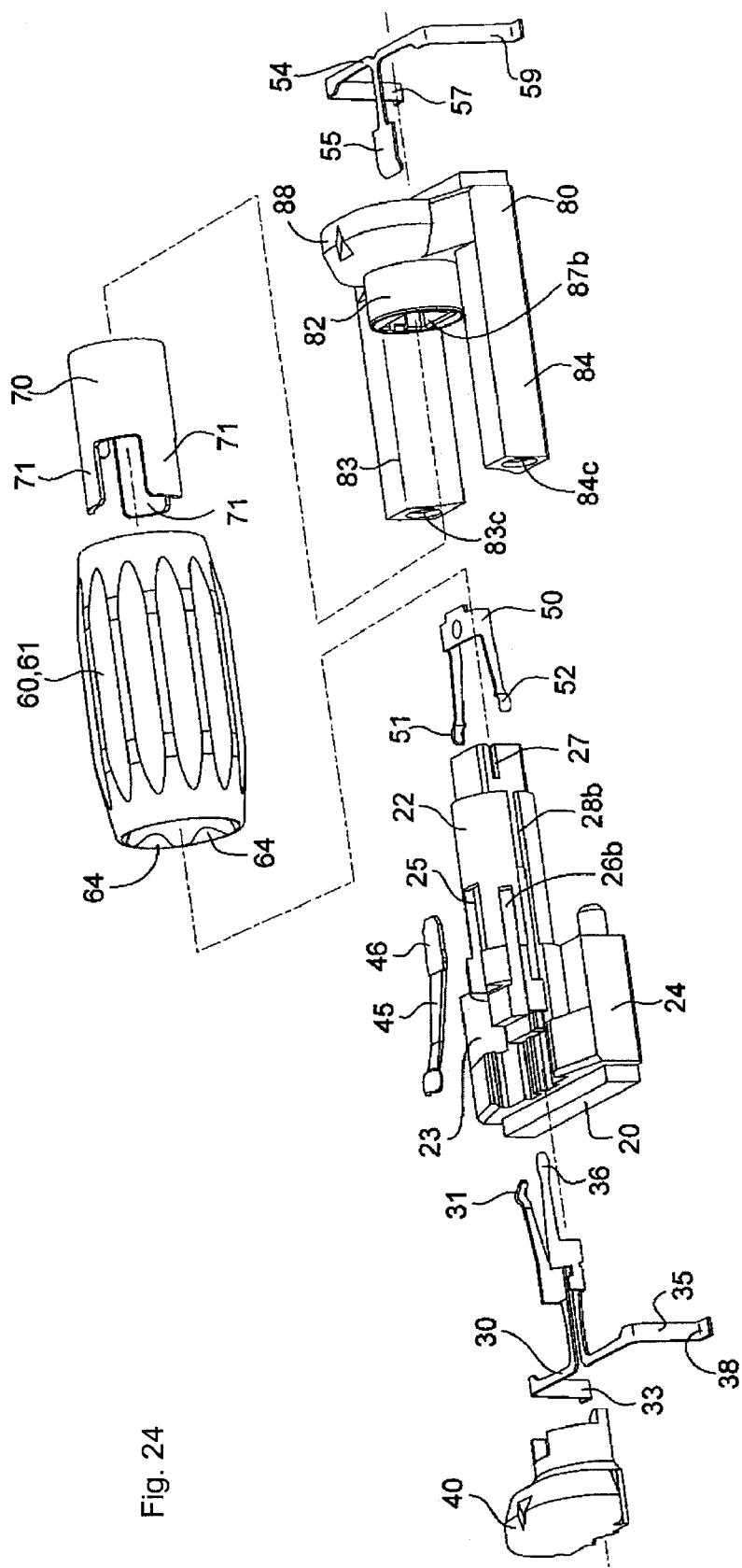
FIG. 24 is an exploded perspective view of the rotating-pressing operation type electronic part in accordance with the fifth embodiment mode.

As shown in FIGS. 22 to 24, a fifth embodiment mode shows a case in which pressing operation portions 40, 88 are set to be independent of the rotating operation portion 61 of the rotating operation body 60. The above pressing operation portion 40 functions the first and second contact pieces 30, 35 as a cover for escape prevention.

In accordance with this embodiment mode, since the push-down pins 21, 81 are located just below the pressing operation portions 40, 88 and the push button switches 111a, 111b can be operated, there is an advantage in that the operating feel is good. Since the other portions are approximately similar to those of the above fourth embodiment mode, the same portions are designated by the same reference numerals and their explanations are omitted.

Figure 25A:
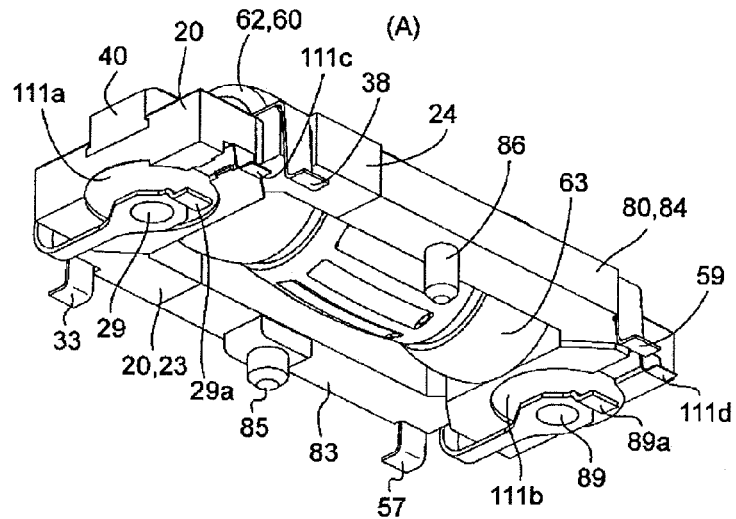
FIG. 25A is a perspective view of a rotating-pressing operation type electronic part in accordance with a sixth embodiment mode.
Figure 25B:
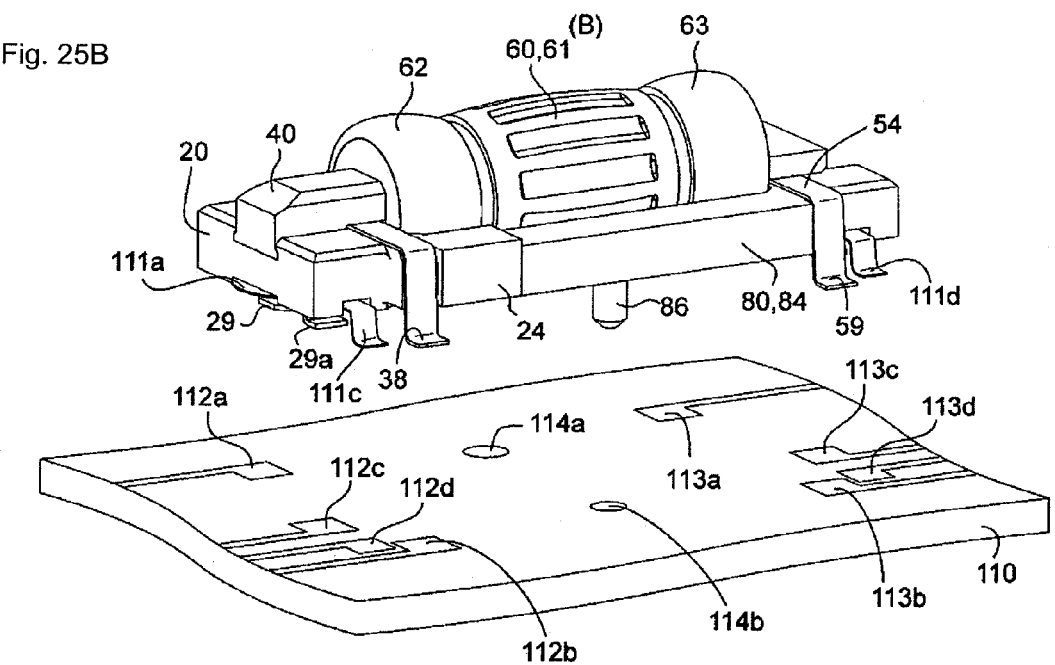
FIG. 25B is an exploded perspective view for explaining a mounting method of the rotating-pressing operation type electronic part of the sixth embodiment mode with respect to a print substrate.
Figure 26A:
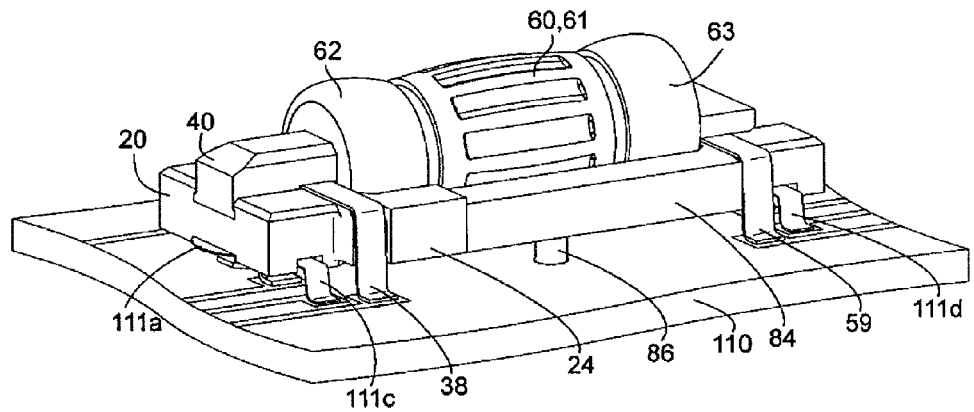
FIG. 26A is a perspective view showing a mounting state of the sixth embodiment mode.
Figure 26B:
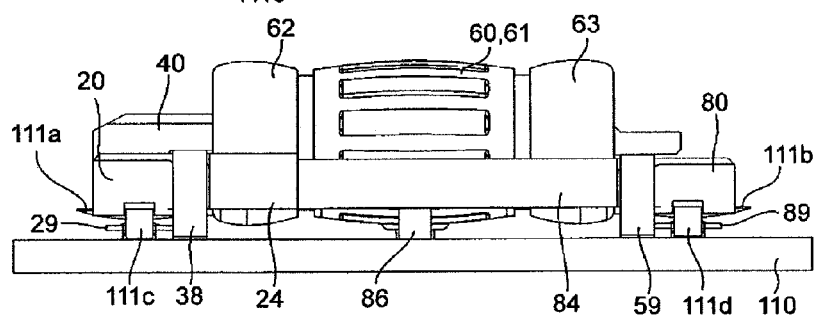
FIG. 26B is a front view of FIG. 26A.
Figure 26C:
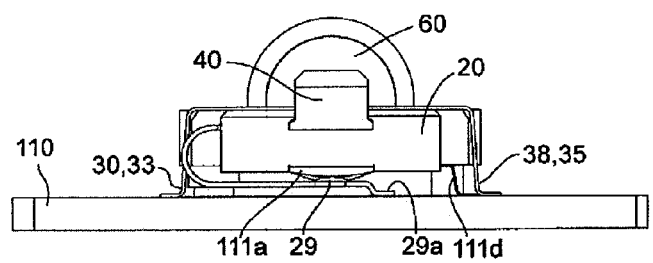
FIG. 26C is a right-hand side view of FIG. 26A.
Figure 26D:
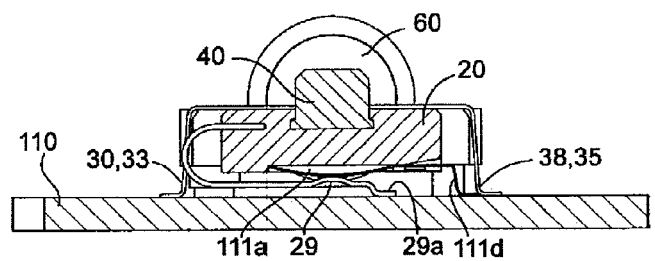
FIG. 26D is a right-hand side sectional view of FIG. 26A.

As shown in FIGS. 25 and 26, a sixth embodiment mode shows a case in which push button switches 111a, 111b are integrated on the lower faces of the first base 20 and the second base 80. Lead terminals 111c, 111d respectively extend from the above push button switches 111a, 111b, and can be respectively connected to connecting pads 112d, 113d of the print substrate 110. Further, elastic operation pieces 29, 89 respectively press against the above push button switches 111a, 111b, and function as lead terminals and approximately have a J-shape. The elastic operation pieces 29, 89 are respectively integrally molded in the first base 20 and the second base 80. Tip portions 29a, 89a of the above elastic operation pieces 29, 89 are respectively soldered to connecting pads 112c, 113c arranged in the print substrate 110.

Accordingly, in accordance with this embodiment mode, the scroll bar within the monitor 107 of the above portable telephone 10 is moved by rotating the rotating operation body 60. Thereafter, the first base 20 and the second base 80 are lowered by pushing down the above rotating operation body 60. The elastic operation pieces 29, 89 respectively operate the push button switches 111a, 111b. Thus, selecting determination signals are respectively outputted through tip portions 29a, 89a of the elastic operation pieces 29, 89 and lead terminals 111c, 111d.

In accordance with this embodiment mode, it is not necessary to mount the push button switches 111a, 111b to the print substrate 110. Accordingly, there are advantages in that wiring of the print substrate 110 is easily designed and integration density can be raised.

Figure 27:
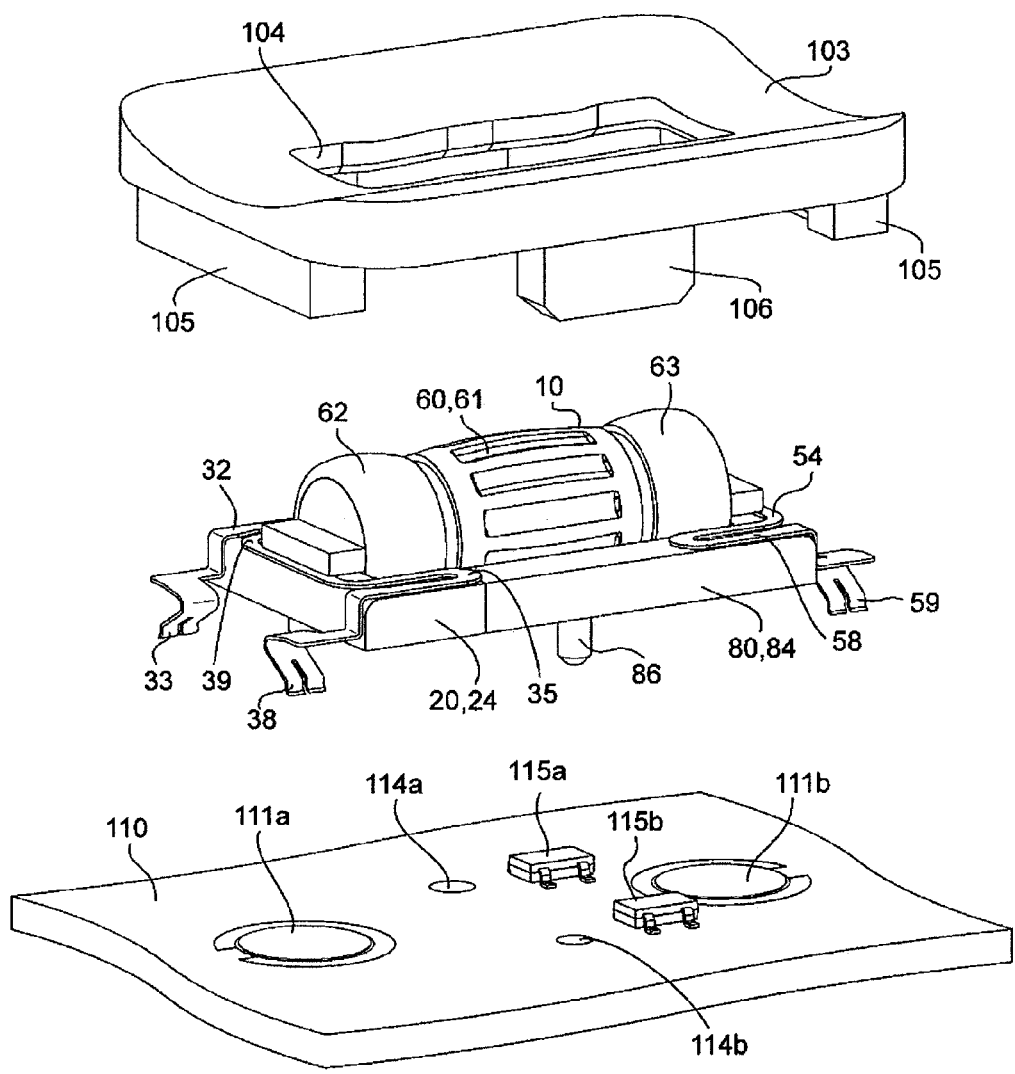
FIG. 27 is an exploded perspective view for explaining a method for mounting a rotating-pressing operation type electronic part in accordance with a seventh embodiment mode to a print substrate.
Figure 28A:
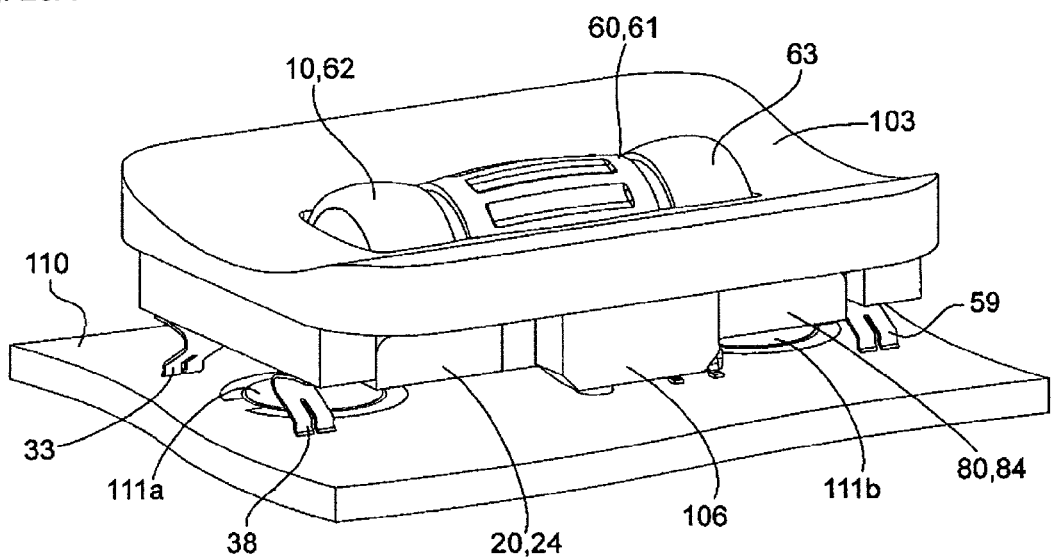
FIGS. 28A and 28B are a perspective view and a front view showing a mounting state of the seventh embodiment mode.
Figure 28B:
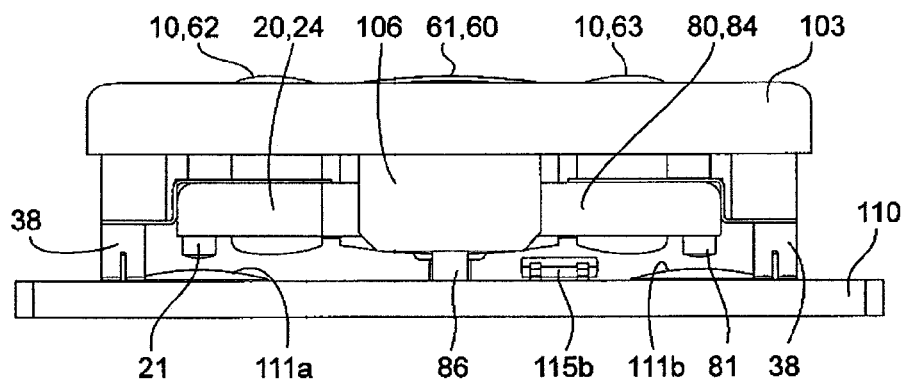

As shown in FIGS. 27 and 28, a seventh embodiment mode shows a case in which a rotating direction and a rotating amount of the rotating operation body 60 are detected by Hall ICs 115a, 115b (Hall elements may also used) mounted to the surface of the print substrate 110. In accordance with this embodiment mode, a permanent magnet having the N-poles and the S-poles alternately arranged and formed in a ring shape is assembled into the above rotating operation body 60 on the same axis, and a change of a magnetic flux can be detected by the above Hall ICs 115a, 115b by rotating the rotating operation body 60.

In accordance with this embodiment mode, the contact piece 39 formed by connecting and integrating only the terminal portions 33, 38 and the connecting portions 32, 35, and the contact piece 54 formed by connecting and integrating only the terminal portions 57, 59 and the connecting portions 56, 58 can be used as a mere support spring. Therefore, no connecting pad is required in the print substrate 110, and print wiring is easily designed. Further, there are advantages in that no internal contact mechanism in accordance with the above embodiment mode is required and the structure becomes simple. Since the other portions are approximately similar to those of the above first embodiment mode, the same portions are designated by the same reference numerals and their explanations are omitted.

The present invention is not limited to the above embodiment modes. For example, a push button switch and a Hall element may be also respectively attached to the first base and the second base.

INDUSTRIAL APPLICABILITY

The rotating-pressing operation type electronic part in the present invention is not limited to the portable telephone, but can be also applied to a personal computer and a mobile device.

The invention claimed is:

1. A rotating-pressing operation type electronic part comprising: a frame body; a rotating operation body of a sleeve shape rotatably supported within said frame body; and at least three electrically conductive leg portions attached to said frame body and able to be elastically deformed, wherein tip portions of said electrically conductive leg portions are directly positioned in a print substrate and are electrically connected to the print substrate.

2. The rotating-pressing operation type electronic part according to claim 1, wherein the electrically conductive leg portion has a connecting portion approximately curved in a U-shape.

3. The rotating-pressing operation type electronic part according to claim 2, wherein a free end portion of the electrically conductive leg portion is divided into two portions, and is approximately bent in a V-shape.

4. The rotating-pressing operation type electronic part according to claim 2, wherein at least one magnetic detecting means able to magnetically detect the rotation of the rotating operation body is arranged in the frame body.

5. The rotating-pressing operation type electronic part according to claim 2, wherein a push button switch is arranged on a lower face of the frame body.

6. An electronic device using a rotating-pressing operation type electronic part in which the electronic device is constructed by the rotating-pressing operation type electronic part according to claim 2; and the print substrate for directly electrically connecting a tip portion of the electrically conductive leg portion of this rotating-pressing operation type electronic part, and mounting a push button switch so as to be located just below the frame body of said rotating-pressing operation type electronic part, wherein detecting data of a rotating direction and a rotating amount of said rotating operation body are outputted through said electrically conductive leg portion by rotating the rotating operation body of said rotating-pressing operation type electronic part, and said push button switch is operated by pushing down said frame body.

7. The rotating-pressing operation type electronic part according to claim 1, wherein a free end portion of the electrically conductive leg portion is divided into two portions, and is approximately bent in a V-shape.

8. The rotating-pressing operation type electronic part according to claim 7, wherein at least one magnetic detecting means able to magnetically detect the rotation of the rotating operation body is arranged in the frame body.

9. The rotating-pressing operation type electronic part according to claim 7, wherein a push button switch is arranged on a lower face of the frame body.

10. An electronic device using a rotating-pressing operation type electronic part in which the electronic device is constructed by the rotating-pressing operation type electronic part according to claim 7; and the print substrate for directly electrically connecting a tip portion of the electrically conductive leg portion of this rotating-pressing operation type electronic part, and mounting a push button switch so as to be located just below the frame body of said rotating-pressing operation type electronic part, wherein detecting data of a rotating direction and a rotating amount of said rotating operation body are outputted through said electrically conductive leg portion by rotating the rotating operation body of said rotating-pressing operation type electronic part, and said push button switch is operated by pushing down said frame body.

11. The rotating-pressing operation type electronic part according to claim 1, wherein at least one magnetic detecting means able to magnetically detect the rotation of the rotating operation body is arranged in the frame body.

12. The rotating-pressing operation type electronic part according to claim 11, wherein a push button switch is arranged on a lower face of the frame body.

13. An electronic device using a rotating-pressing operation type electronic part in which the electronic device is constructed by the rotating-pressing operation type electronic part according to claim 11; and the print substrate for directly electrically connecting a tip portion of the electrically conductive leg portion of this rotating-pressing operation type electronic part, and mounting a push button switch so as to be located just below the frame body of said rotating-pressing operation type electronic part, wherein detecting data of a rotating direction and a rotating amount of said rotating operation body are outputted through said electrically conductive leg portion by rotating the rotating operation body of said rotating-pressing operation type electronic part, and said push button switch is operated by pushing down said frame body.

14. The rotating-pressing operation type electronic part according to claim 1, wherein a push button switch is arranged on a lower face of the frame body.

15. An electronic device using a rotating-pressing operation type electronic part in which the electronic device is constructed by the rotating-pressing operation type electronic part according to claim 14; and the print substrate for directly electrically connecting a tip portion of the electrically conductive leg portion of this rotating-pressing operation type electronic part, and able to directly electrically connect a lead terminal of the push button switch of said rotating-pressing operation type electronic part, wherein detecting data of a rotating direction and a rotating amount of said rotating operation body are outputted through said electrically conductive leg portion by rotating the rotating operation body of said rotating-pressing operation type electronic part, and said push button switch is operated by pushing down said frame body.

16. An electronic device using a rotating-pressing operation type electronic part in which the electronic device is constructed by the rotating-pressing operation type electronic part according to claim 14; and the print substrate for directly electrically connecting a tip portion of the electrically conductive leg portion of this rotating-pressing operation type electronic part, and mounting a push button switch so as to be located just below the frame body of said rotating-pressing operation type electronic part, wherein detecting data of a rotating direction and a rotating amount of said rotating operation body are outputted through said electrically conductive leg portion by rotating the rotating operation body of said rotating-pressing operation type electronic part, and said push button switch is operated by pushing down said frame body.

17. An electronic device using a rotating-pressing operation type electronic part in which the electronic device is constructed by the rotating-pressing operation type electronic part according to claim 1; and the print substrate for directly electrically connecting a tip portion of the electrically conductive leg portion of this rotating-pressing operation type electronic part, and mounting a push button switch so as to be located just below the frame body of said rotating-pressing operation type electronic part, wherein detecting data of a rotating direction and a rotating amount of said rotating operation body are outputted through said electrically conductive leg portion by rotating the rotating operation body of said rotating-pressing operation type electronic part, and said push button switch is operated by pushing down said frame body.

18. An electronic device using a rotating-pressing operation type electronic part in which the electronic device is constructed by the rotating-pressing operation type electronic part according to claim 1; and the print substrate for soldering and directly electrically connecting a tip portion of the electrically conductive leg portion of this rotating-pressing operation type electronic part, and mounting a push button switch so as to be located just below the frame body of said rotating-pressing operation type electronic part, wherein detecting data of a rotating direction and a rotating amount of said rotating operation body are outputted through said electrically conductive leg portion by rotating the rotating operation body of said rotating-pressing operation type electronic part, and said push button switch is operated by pushing down said frame body.

19. A rotating-pressing operation type electronic part comprising: a frame body; a rotating operation body of a sleeve shape rotatably supported within said frame body; an annular magnet having N-poles and S-poles alternately arranged at a predetermined angle pitch and assembled into said rotating operation body on the same axis; and plural leg portions attached to said frame body and able to be elastically deformed, wherein said leg portions are directly positioned in a print substrate.

20. An electronic device using a rotating-pressing operation type electronic part in which the electronic device is constructed by the rotating-pressing operation type electronic part according to claim 19; and the print substrate for mounting at least one magnetic detecting means in a position able to detect a magnetic flux of an annular magnet of this rotating-pressing operation type electronic part, and mounting a push button switch so as to be located just below the frame body of said rotating-pressing operation type electronic part, wherein a rotating direction and a rotating amount of said rotating operation body are detected by said magnetic detecting means by rotating the rotating operation body of said rotating-pressing operation type electronic part, and said push button switch is operated by pushing down said frame body.

* * * * *